US010881247B2

(12) United States Patent
Brown et al.

(10) Patent No.: US 10,881,247 B2
(45) Date of Patent: *Jan. 5, 2021

(54) FOOD PROCESSING SYSTEM AND INTERCHANGEABLE ACTUATED ACCESSORIES

(71) Applicant: Bar None Kitchen Products, LLC, Norfolk, CT (US)

(72) Inventors: Jennie K. Brown, Norfolk, CT (US); Roy P. Prosise, Cedar Park, TX (US); Daniel Caputo, Cedar Park, TX (US); Benjamin Derek Litteral, Austin, TX (US)

(73) Assignee: Havisham Boye and Brown, LLC, Norfolk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,909

(22) Filed: Aug. 6, 2019

(65) Prior Publication Data

US 2019/0357729 A1  Nov. 28, 2019

Related U.S. Application Data

(63) Continuation of application No. 15/583,637, filed on May 1, 2017, now Pat. No. 10,413,129.

(Continued)

(51) Int. Cl.
*A47J 43/07* (2006.01)
*A47J 19/04* (2006.01)
(Continued)

(52) U.S. Cl.
CPC ............ *A47J 43/07* (2013.01); *A47J 19/02* (2013.01); *A47J 19/04* (2013.01); *A47J 19/06* (2013.01);
(Continued)

(58) Field of Classification Search
CPC ........ B26D 3/185; B26D 1/09; B65D 81/262; B65D 81/265; B65D 81/245;
(Continued)

(56) References Cited

U.S. PATENT DOCUMENTS 858,997 A    7/1907  Low
874,133 A   12/1907  Stevens
(Continued)

OTHER PUBLICATIONS

Intellectual Property Office, Examination Report under Section 18(3) dated Aug. 15, 2019 in Application No. GB1817982.0, four pages.

(Continued)

*Primary Examiner* — Kevin F Murphy
(74) *Attorney, Agent, or Firm* — Dickinson Wright, PLLC; Michael E. Noe, Jr.

(57) ABSTRACT

A food processing system includes a base and an actuator that is releasably mounted to the base. The actuator may have an unactuated position and an actuated position. Numerous accessories each may be individually and interchangeably mountable to and releasable from at least one of the base and the actuator. Each attachment may perform a food processing function when the actuator is moved from the unactuated position to the actuated position.

9 Claims, 39 Drawing Sheets

Related U.S. Application Data

(60) Provisional application No. 62/421,860, filed on Nov. 14, 2016, provisional application No. 62/331,206, filed on May 3, 2016.

(51) Int. Cl.

| | |
|---|---|
| *A47J 19/06* | (2006.01) |
| *A47J 25/00* | (2006.01) |
| *B26D 1/08* | (2006.01) |
| *B26D 1/09* | (2006.01) |
| *B26D 1/553* | (2006.01) |
| *B26D 3/18* | (2006.01) |
| *B26D 5/08* | (2006.01) |
| *B26D 5/10* | (2006.01) |
| *B26D 7/02* | (2006.01) |
| *A47J 19/02* | (2006.01) |
| *A47J 43/06* | (2006.01) |
| *A47J 43/044* | (2006.01) |
| *B26D 1/00* | (2006.01) |

(52) U.S. Cl.
CPC .............. *A47J 25/00* (2013.01); *A47J 43/06* (2013.01); *A47J 43/0711* (2013.01); *B26D 1/08* (2013.01); *B26D 1/09* (2013.01); *B26D 1/553* (2013.01); *B26D 3/185* (2013.01); *B26D 5/083* (2013.01); *B26D 5/10* (2013.01); *B26D 7/02* (2013.01); *A47J 2043/0449* (2013.01); *A47J 2043/04472* (2013.01); *B26D 2001/0033* (2013.01); *B26D 2210/02* (2013.01)

(58) Field of Classification Search
CPC . B65D 2543/00564; B65D 2543/00972; A47J 43/0711; F16L 27/0808
USPC .......... 277/641, 549, 407; 220/804; 285/275
See application file for complete search history.

(56) References Cited

U.S. PATENT DOCUMENTS

| | | | | |
|---|---|---|---|---|
| 1,110,946 | A ‡ | 9/1914 | Lahiere | ................... B26B 23/00 30/128 |
| 1,325,869 | A ‡ | 12/1919 | Boos et al. | ............ B26D 3/185 83/425.2 |
| 2,563,237 | A ‡ | 8/1951 | Grocoff | .................... A01J 23/00 160/378 |
| 3,997,198 | A * | 12/1976 | Linder | ............... F16L 27/0832 285/98 |
| 4,062,260 | A ‡ | 12/1977 | Steinhogl | ................ B26B 5/008 83/404.3 |
| 4,332,188 | A * | 6/1982 | Rhear | ................. A47J 37/0623 99/323.5 |
| 5,245,902 | A ‡ | 9/1993 | Pereira | ................... B26D 3/185 83/425.3 |
| 5,782,165 | A ‡ | 7/1998 | Glenboski | ............. A47J 27/004 219/401 |
| 8,495,941 | B2 ‡ | 7/2013 | Farid | ..................... B26D 3/185 30/114 |
| 8,857,325 | B2 ‡ | 10/2014 | Brown | ................... A21C 15/04 99/537 |
| 9,004,301 | B2 * | 4/2015 | Wahlstrom | ................ A61J 9/00 215/6 |
| 10,413,129 | B2 * | 9/2019 | Brown | .................... A47J 43/07 |
| 2001/0047726 | A1 | 12/2001 | Zarlengo | |
| 2010/0224041 | A1 ‡ | 9/2010 | Melton | .................... B26D 1/09 83/13 |
| 2010/0275792 | A1 | 11/2010 | Brown | |
| 2012/0085765 | A1 * | 4/2012 | Lan | ...................... B65D 43/022 220/378 |
| 2015/0165634 | A1 ‡ | 6/2015 | Golomb | .................. B26D 3/26 83/13 |
| 2016/0039107 | A1 ‡ | 2/2016 | Varanasi | ................ B26D 3/185 83/599 |

OTHER PUBLICATIONS

International Searching Authority, Written Opinion of the International Searching Authority and the International Search Report dated Sep. 7, 2017 in International Application No. PCT/US2017/030401, nine pages.

\* cited by examiner
‡ imported from a related application

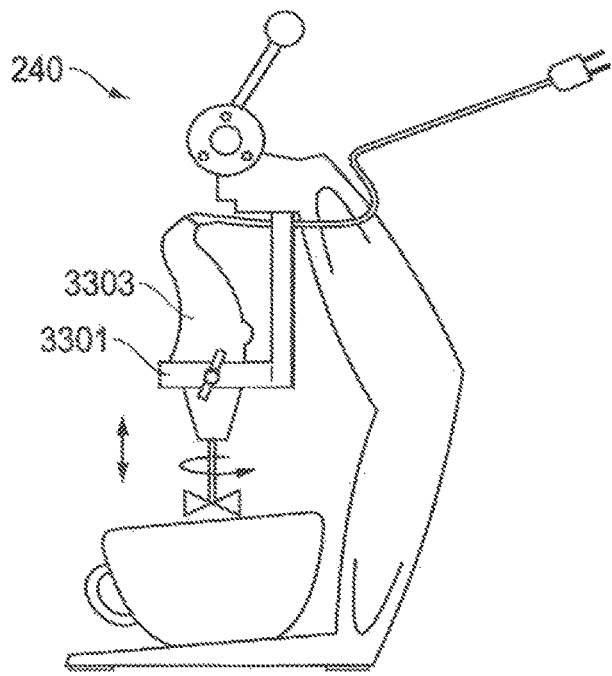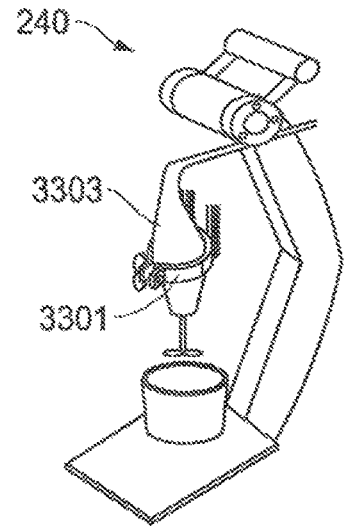
FIG. 33A          FIG. 33B
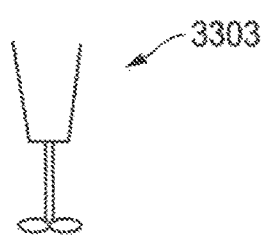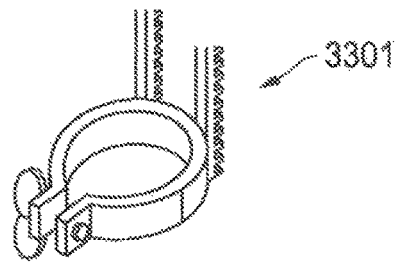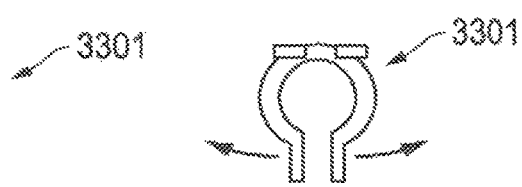
FIG. 33C          FIG. 33D          FIG. 33E

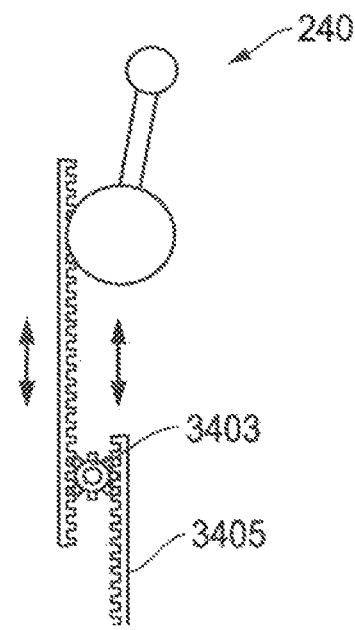
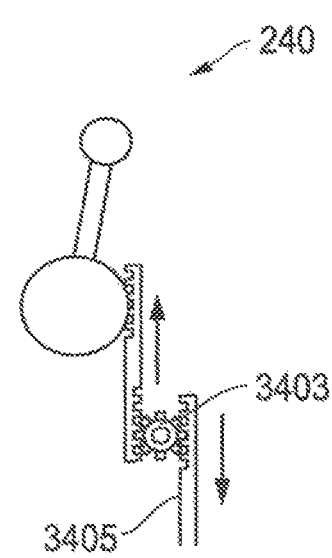
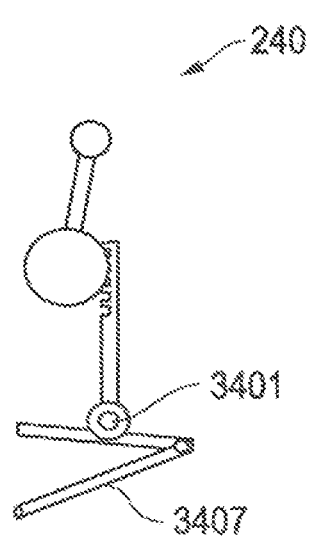
FIG. 34A          FIG. 34B          FIG. 34C
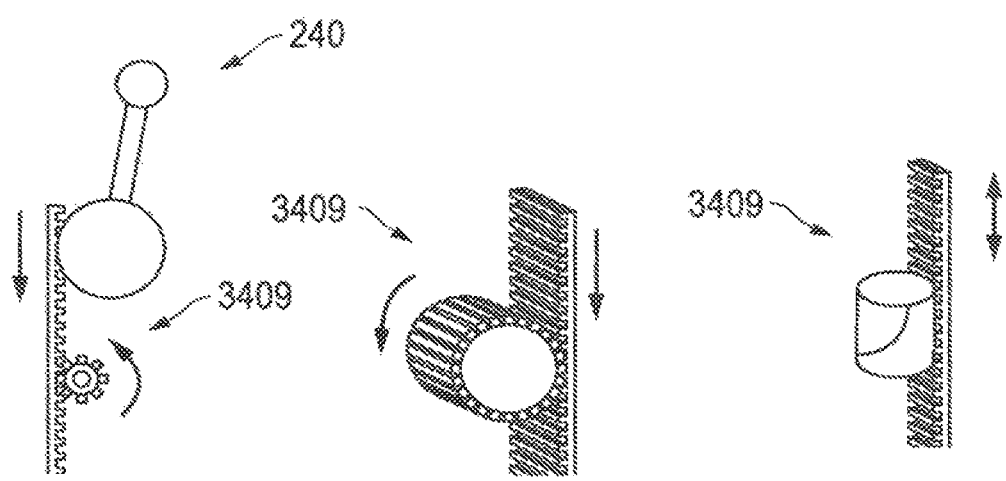
FIG. 34D          FIG. 34E          FIG. 34F

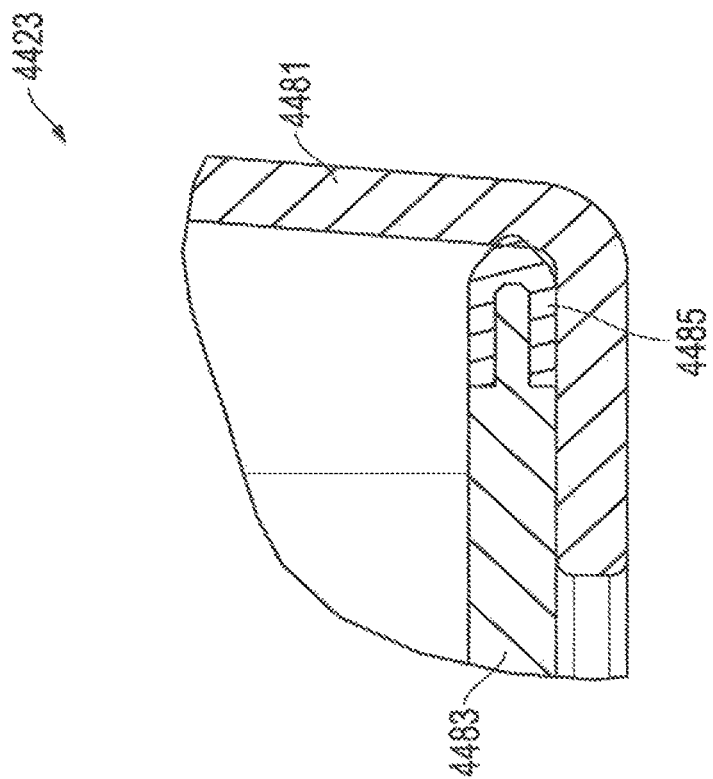
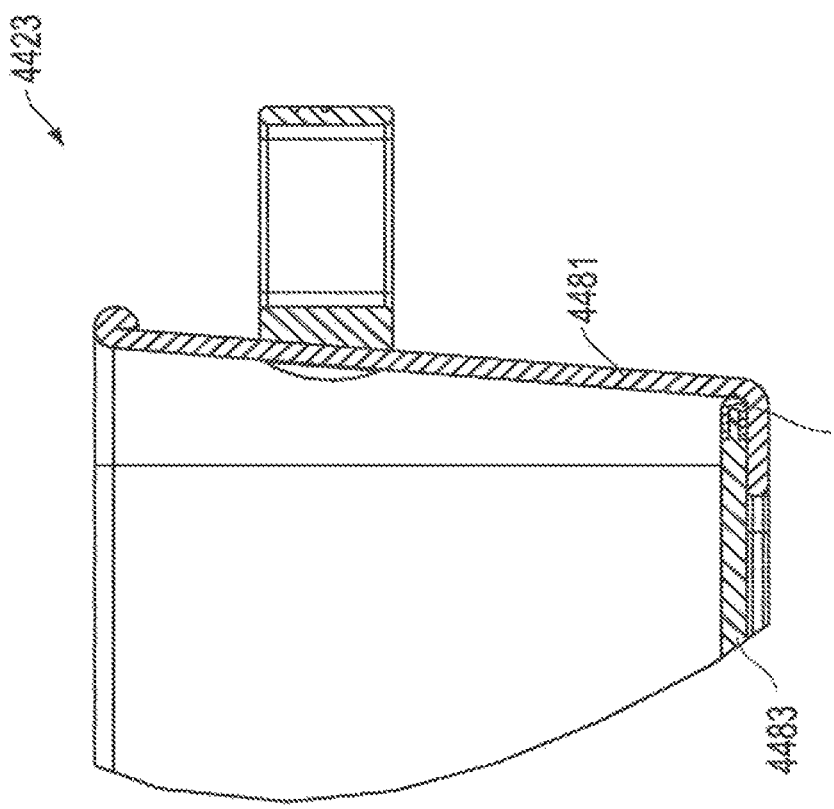

FOOD PROCESSING SYSTEM AND INTERCHANGEABLE ACTUATED ACCESSORIES

This application claims priority to and the benefit of U.S. patent application Ser. No. 15/583,637, filed May 1, 2017, which claims priority to and the benefit of U.S. Prov. Pat. App. No. 62/331,206, filed May 3, 2016, and U.S. Prov. Pat. App. No. 62/421,860, filed Nov. 14, 2016, each of which is incorporated herein by reference in its entirety.

BACKGROUND OF THE INVENTION

Field of the Disclosure

The present invention relates in general to kitchen accessories and, in particular, to a system, method and apparatus for a food cutter and interchangeable, actuated kitchen accessories.

Description of the Prior Art

Some foods are prepared, sliced or otherwise processed into smaller portions. The task of preparing foods into desirable shapes or sizes is commonly performed with conventional tools known in the art. It can be difficult to prepare food into desired shapes and sizes with some tools. Although conventional designs are workable for some food preparation applications, improvements in food processing tools continue to be of interest.

SUMMARY

Embodiments of a food processing system are disclosed. For example, a food processing system may include a base and an actuator configured to be releasably mounted to the base. The actuator has an unactuated position and an actuated position. A plurality of accessories, may each be configured to be individually and interchangeably mountable to and releasable from at least one of the base or the actuator. Each accessory performs a food processing function when the actuator is moved from the unactuated position to the actuated position.

Another embodiment of a food processing system includes a pan having a surface configured to support food. A cutter is configured to be mounted to the pan. The cutter is configured to move relative to the pan via leverage therebetween to cut food in the pan. An actuator is configured to be releasably attached to the pan. The actuator is configured to move the cutter relative to the pan. A press is configured to be coupled to the cutter and configured to retain food in the pan as the cutting elements are removed from the food after cutting the food.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

FIGS. 17-33E depict views of various embodiments of accessories for a food processing system.

FIGS. 34A-37G depict views of various embodiments of mechanisms for attaching various components of a food processing system.

FIGS. 44A and 44B are sectional side and enlarged sectional side views of an alternate embodiment.

The use of the same reference symbols in different drawings indicates similar or identical items.

DETAILED DESCRIPTION

Figure 15:
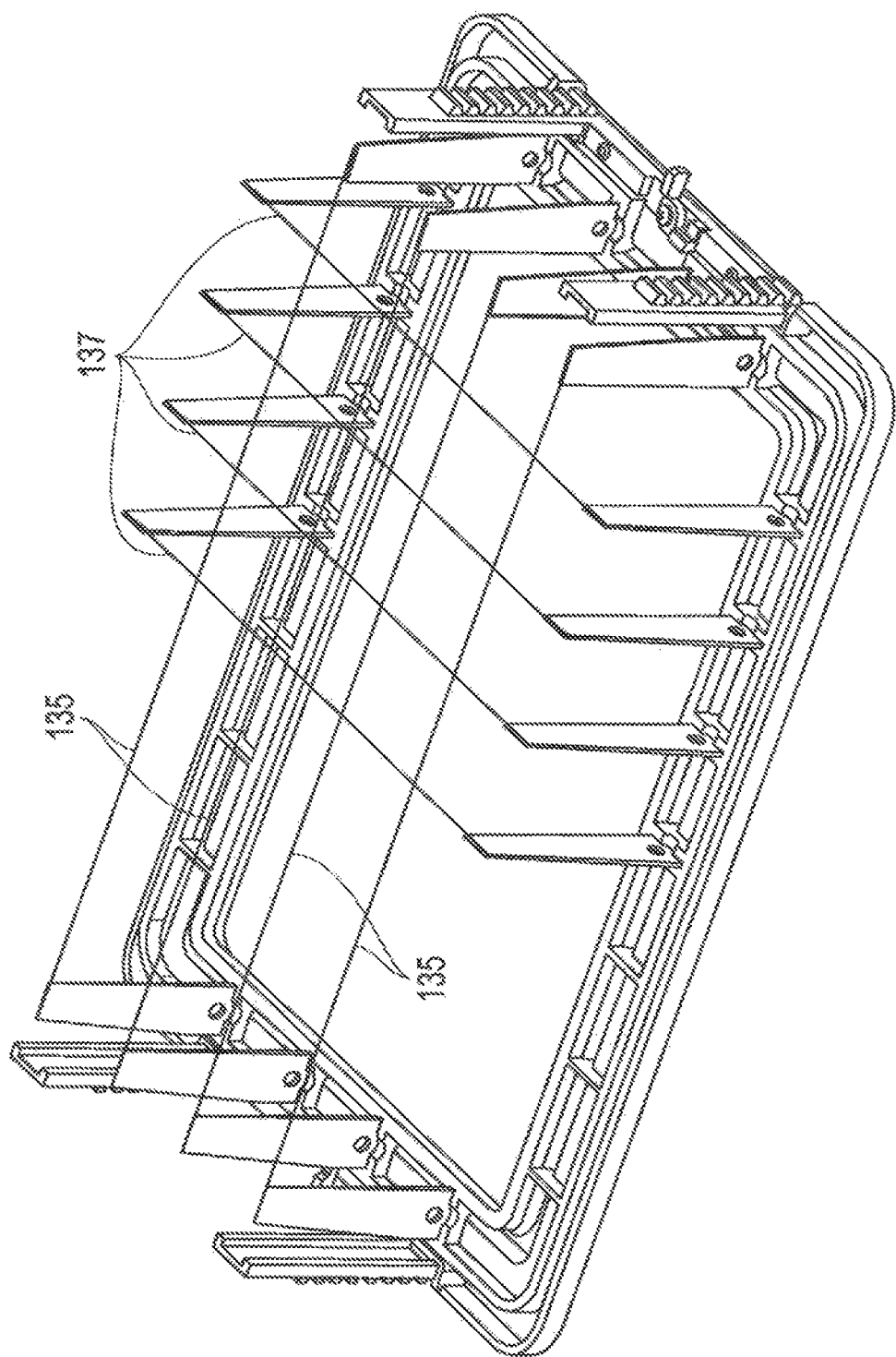
FIG. 15 is a bottom isometric view of an alternate embodiment of a cutter.

Embodiments of a system, method and apparatus for a food processing system and interchangeable, actuated accessories are disclosed. For example, as depicted in FIGS. 1-4, one version of a food cutting system 21 may include a pan 23 having a bottom surface 25 configured to support food. The food cutting system 21 may further include a cutter 31 configured to be mounted to the pan 23. In an example, the cutter 31 may comprise a base 33 and cutting elements, such as blades 35, 37, extending from the base 33. Alternate embodiments (FIG. 15) may include wires 135, 137 instead of blades 35, 37. Accordingly, although the following description of various embodiments will describe blades 35, 37, it should be apparent that the described features and elements also may pertain to the wires 135, 137 of the wired versions. The wires or blades 35, 37 may include cutting edges 39 that may be configured to move relative to the pan 23 to cut food. Versions of the wired embodiments may be suitable for cutting low density baked goods.

Figure 1:
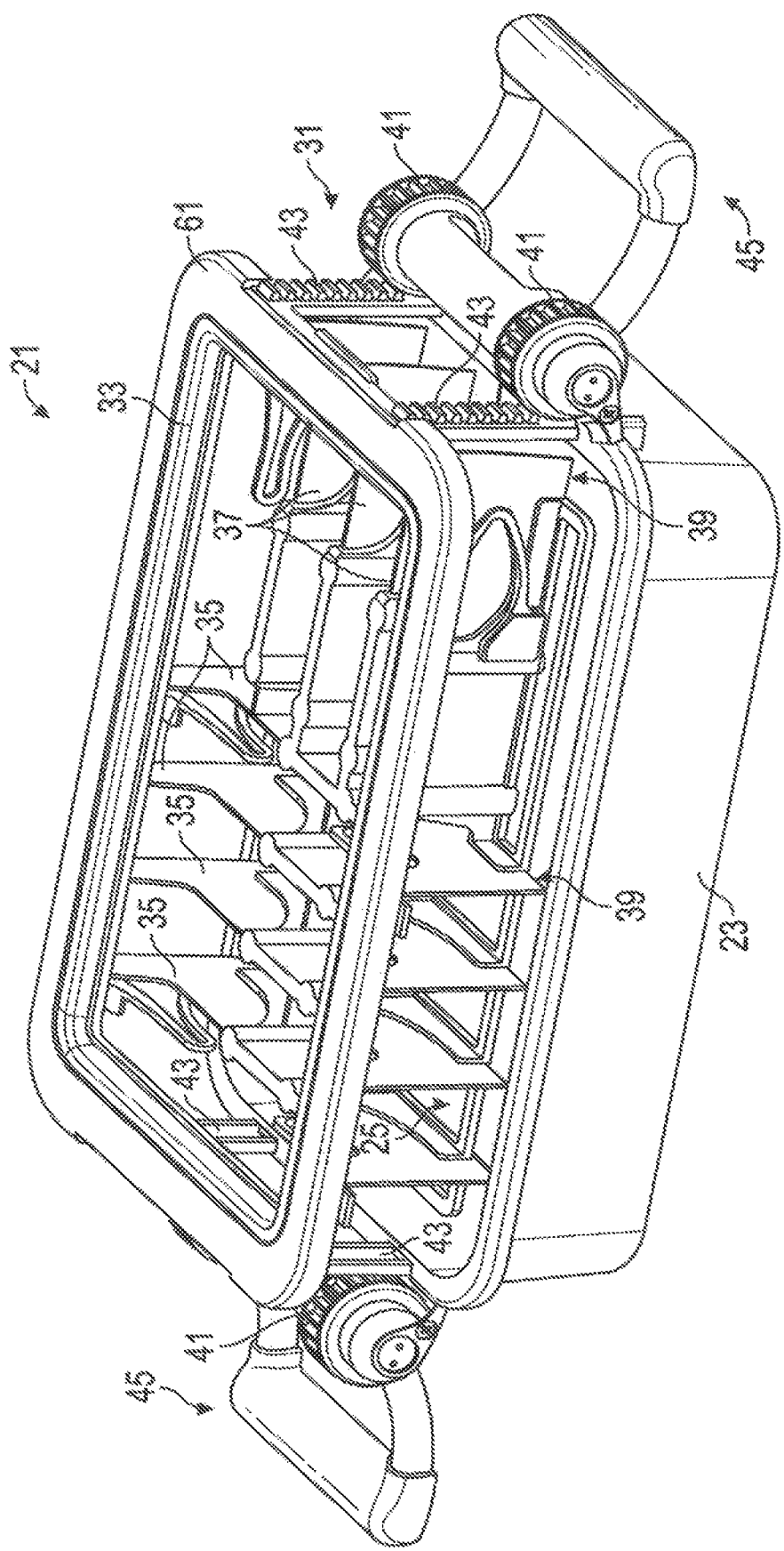
FIG. 1 is a top isometric view of an embodiment of a food cutting system, shown with handles in a non-cutting position.
Figure 2:
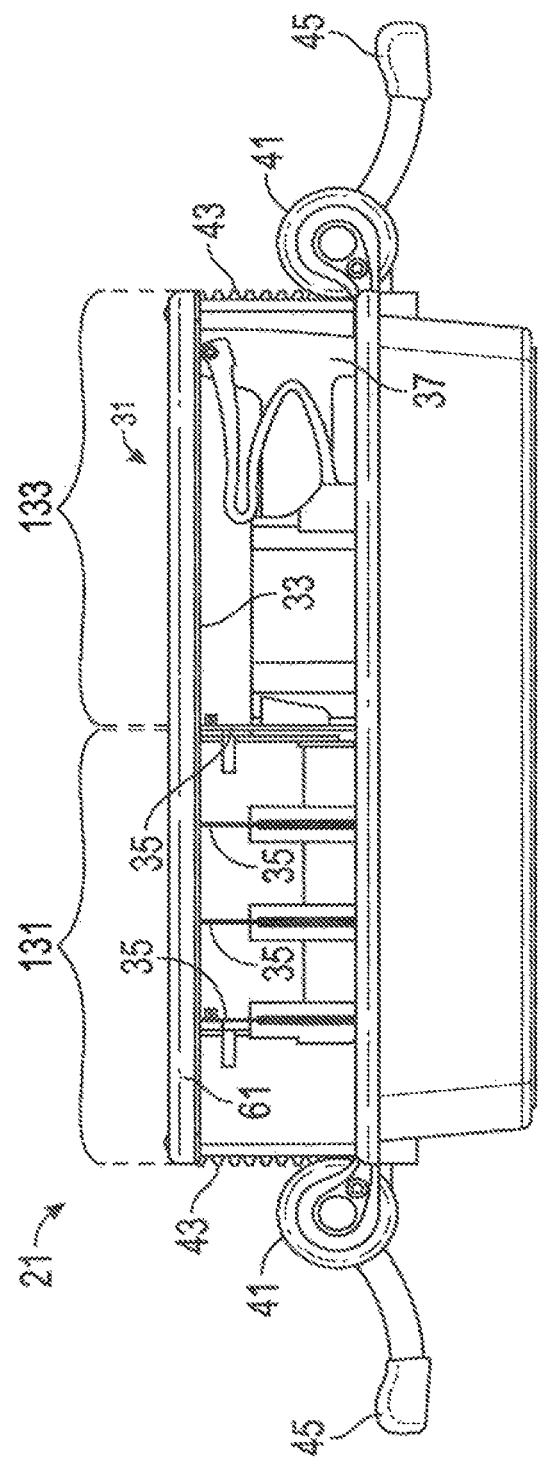
FIG. 2 is a side view of the food cutting system of FIG. 1, also shown with the handles in the non-cutting position.
Figure 3:
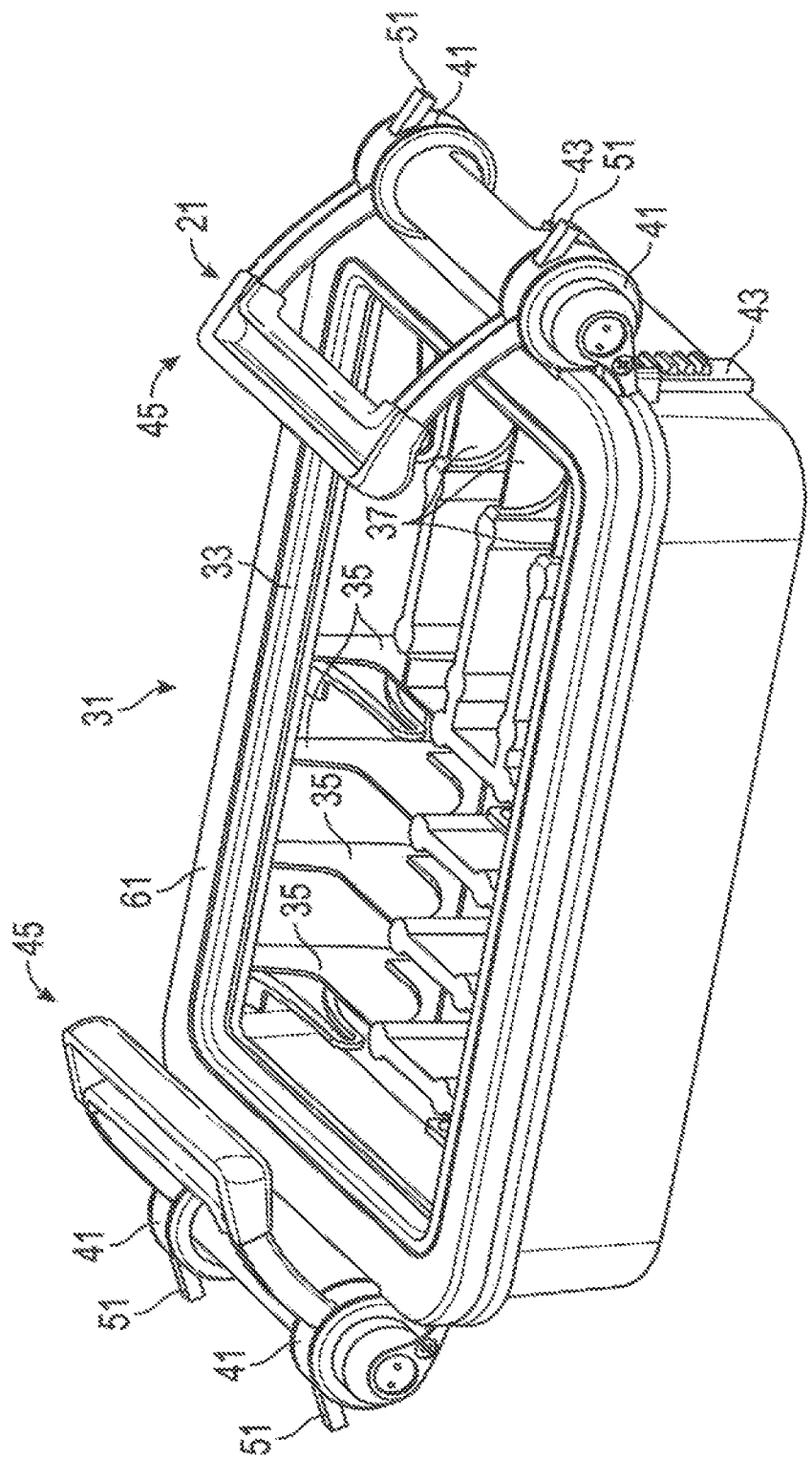
FIG. 3 is a top isometric view of an embodiment of a food cutting system, shown with the handles in a cutting position.
Figure 4:
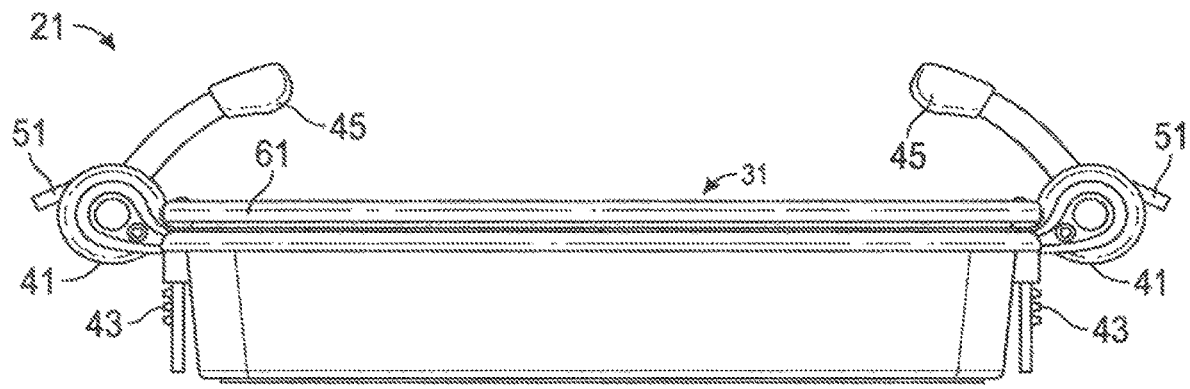
FIG. 4 is a side view of the food cutting system of FIG. 3, also shown with the handles in the cutting position.

Embodiments of the food cutting system 21 may include a non-cutting position (FIGS. 1 and 2) and a cutting position (FIGS. 3 and 4). From the non-cutting position, the cutter 31 may be configured to move relative to the pan 23 via leverage therebetween to the cutting position, and vice-versa. Leverage between the cutter 31 and the pan 23 may be provided in a number of ways. For example, the pan 23 may include one or more gears, such as pinions 41 (e.g., four shown). Embodiments of the cutter 31 may include one or more racks 43, such as linear gear racks (e.g., four shown). Leverage may be provided therebetween by rotating the pinions 41 relative to the racks 43.

Some versions of the pinions 41 may be mounted to handles 45. For example, in FIGS. 1-4, two pinions 41 are shown mounted to each handle 45. Thus, in some embodiments, the pan 23 may include two pinions 41 on each end of the pan 23. The cutter 31 may include two racks 43 on each end of the cutter 31. The two racks 43 on each end may be adjacent to two respective pinions 41 when the cutter 31 is mounted to the pan 23. Rotation of the handles 45 may be configured to move the racks 43 and, thus, the cutter 31 vertically into and out of the food.

In the embodiments shown, the handles 45 may include the non-cutting position wherein handles 45 are rotated outward away from the pan 23. In addition, the handles 45 may include the cutting position wherein handles 45 are rotated inward toward the pan 23, as shown. In some versions (FIG. 5), one or both handles 45 may include detents 47, 49 at each of the non-cutting position and cutting position, respectively, to help retain the handles 45 at those respective positions.

Embodiments of the handles 45 may be configured to rotate in an angular range of movement. For example, the handles 45 may be configured to rotate from about 0 degrees to about 180 degrees. The range of rotation may be on the order of about 110 degrees to about 120 degrees, in some versions.

Figure 5:
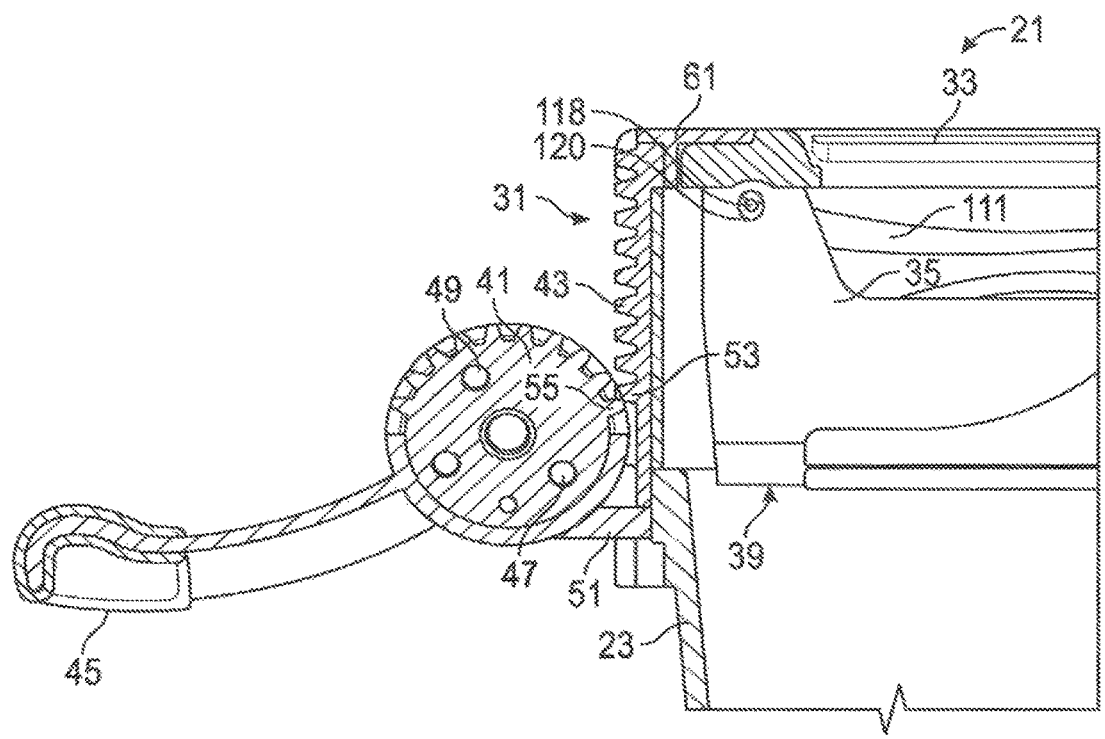
FIG. 5 is an enlarged, partially-sectioned side view of an end of an embodiment of the food cutting system of FIGS. 1-4, shown in the non-cutting position.

As depicted in the drawings, as the handles 45 move from the non-cutting position (FIGS. 1 and 2) to the cutting position (FIGS. 3 and 4), the racks 43 move downward and, in some versions, pass between an exterior of the pan 23 and respective ones of the pinions 41. One or both of the handles 45 may be configured to include a platform 51. For example, in the non-cutting position, the racks 43 may be placed on the platforms 51 (FIG. 5). In some embodiments, again in the non-cutting position, a rack gear tooth 53 on the rack 43 automatically engages a pinion gear tooth 55 on the pinion 41, due to the location and placement capabilities of the platforms 51.

In some versions of the food cutting system 21, one handle 45 and the pinions 41 associated with it (e.g., one or two pinions 41) may be configured to form an assembly. Such an assembly may be configured to be removably or releasably attached to the pan 23. For example, the assembly of the handle 45 and pinions 41 can be attached to a first pan 23, detached from the first pan 23, and then releasably attached to a second pan 23. The first pan 23 may differ in size from the second pan 23; the pans 23 do not have to be identical. Thus, the first and second pans 23 may be interchangeable with the described assembly.

Figure 6:
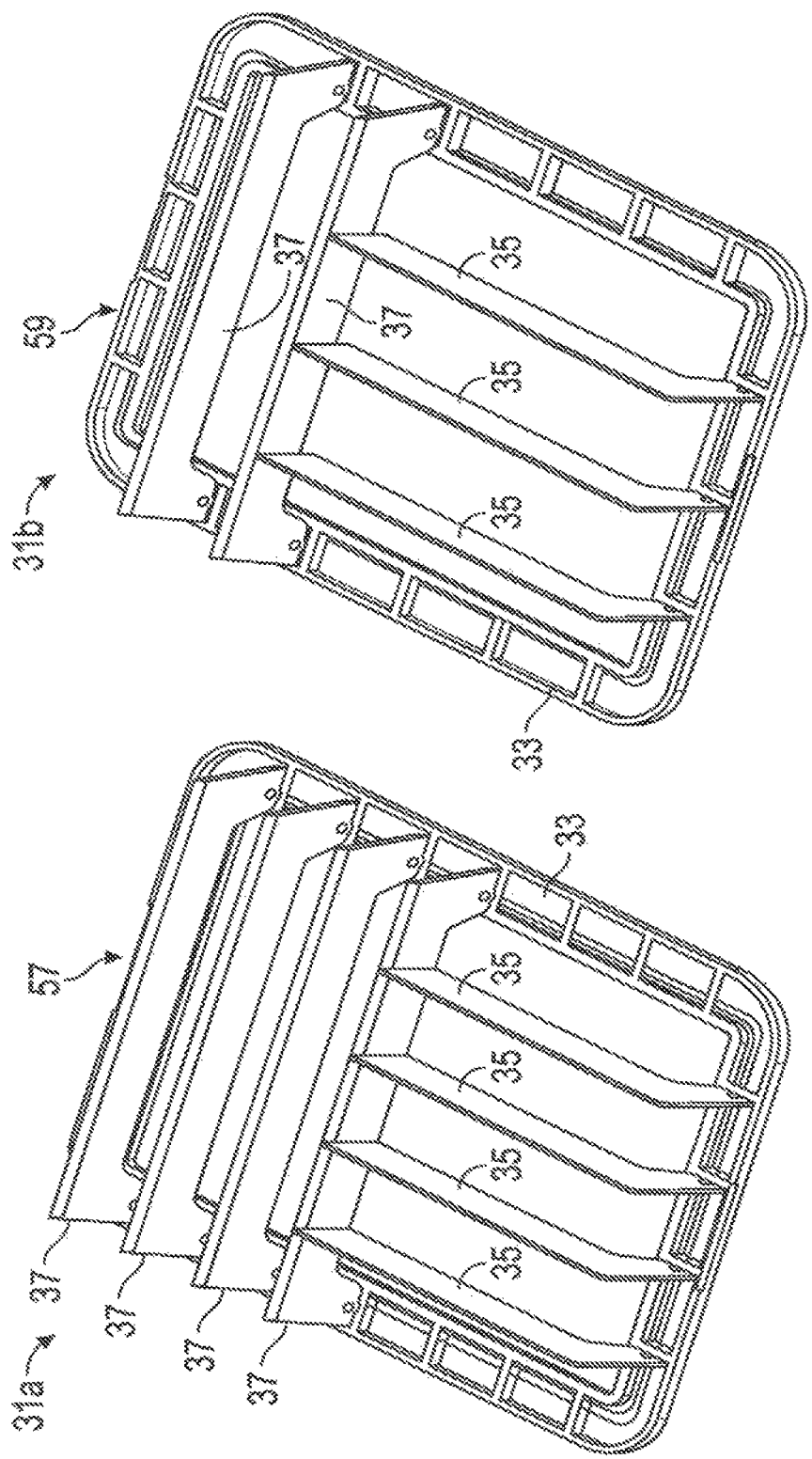
FIGS. 6A and 6B are bottom isometric views of two embodiments of blade patterns for cutters.

Embodiments of the food cutting system 21 may include providing the blades 35, 37 in a pattern, such as a grid, which may be interconnected. Two examples of patterns 57, 59 are shown in FIGS. 6A and 6B. Other patterns also may be provided depending on the application, as further described herein. Thus, the food cutting system 21 may provide a second cutter 31b having a different cutting pattern than the cutter 31a. In addition, the food cutting system 21 may further include a second pan 23 that differs (e.g., a different size) from the pan 23. For example, pan 23 and second pan 23 may differ in size. The pan 23 and the second pan 23 may be interchangeable with the cutter 31, or the cutters 31a, 31b. In an alternate version, the food cutting system 21 may include a plurality of pans 23 and a plurality of cutters 31 that are at least somewhat, if not completely, interchangeable with each other.

Figure 7:
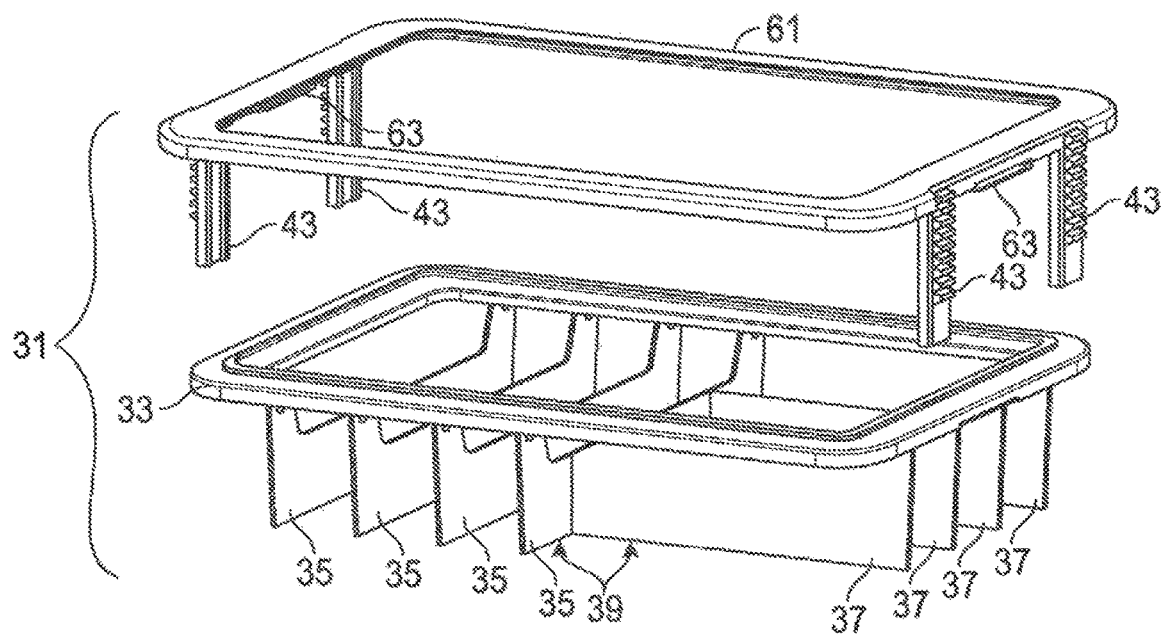
FIG. 7 is an exploded top isometric view of an embodiment of a cutter assembly.
Figure 8:
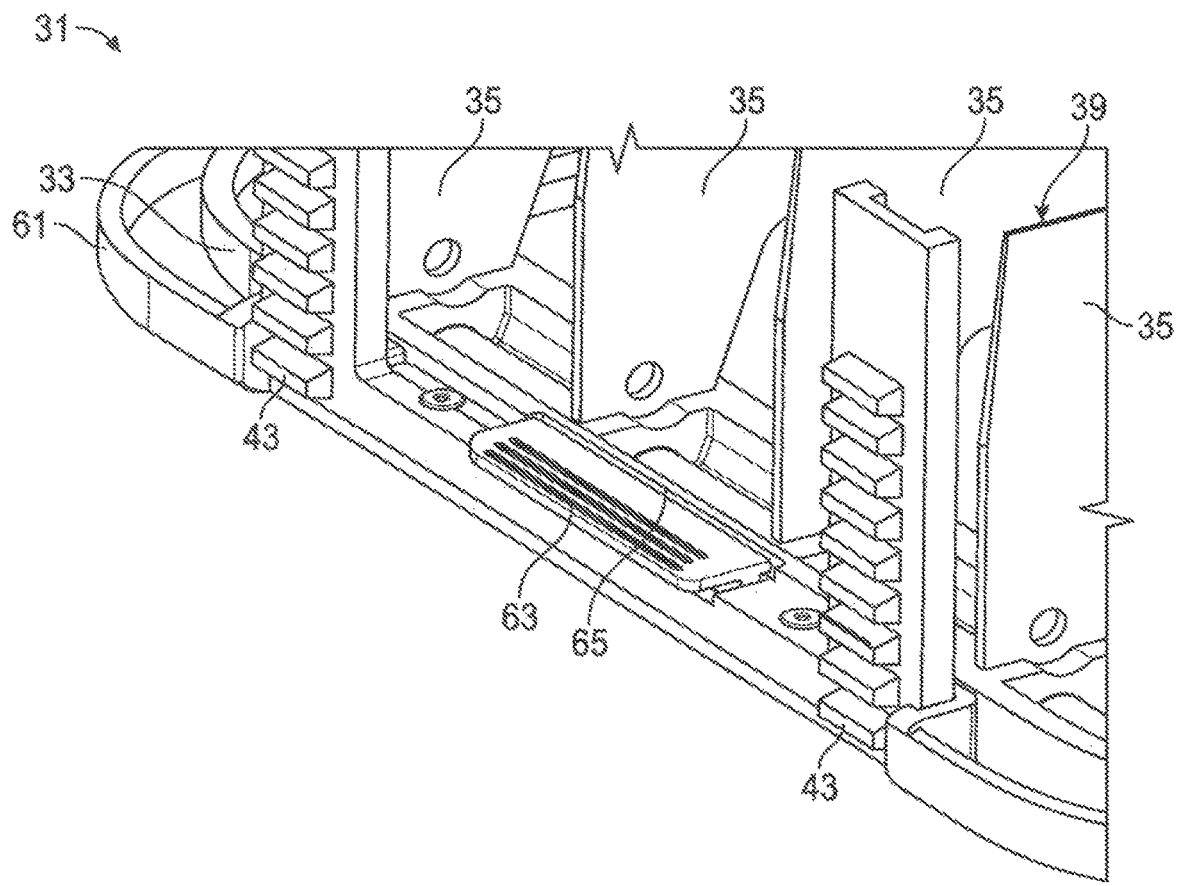
FIG. 8 is an enlarged, bottom isometric view of an embodiment of an end of a cutter assembly after assembly.
Figure 9:
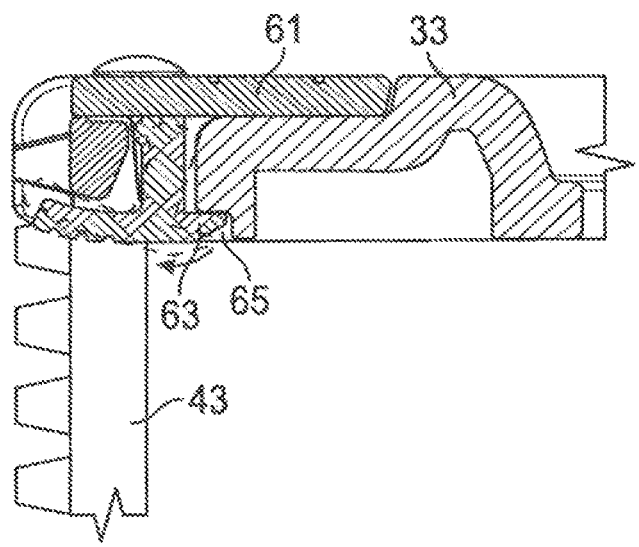
FIG. 9 is an enlarged, sectional side view of an end of an embodiment of a cutter assembly depicting, in phantom lines, a range of motion of a latch which may be actuated to disassemble the cutter assembly.
Figure 41:
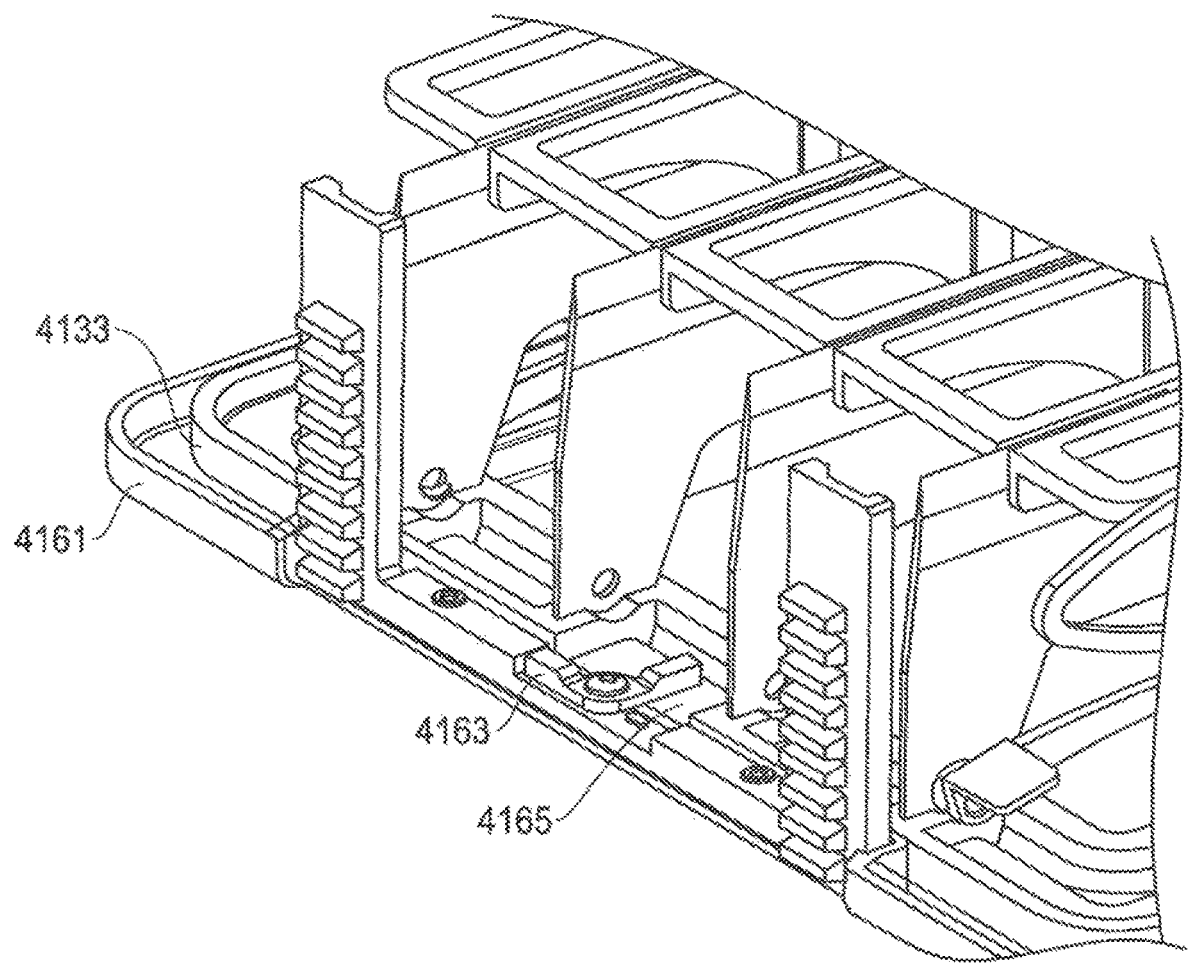
FIGS. 41 and 42 are bottom isometric views of an alternate embodiment of a cutter and frame system shown locked and unlocked, respectively.
Figure 42:
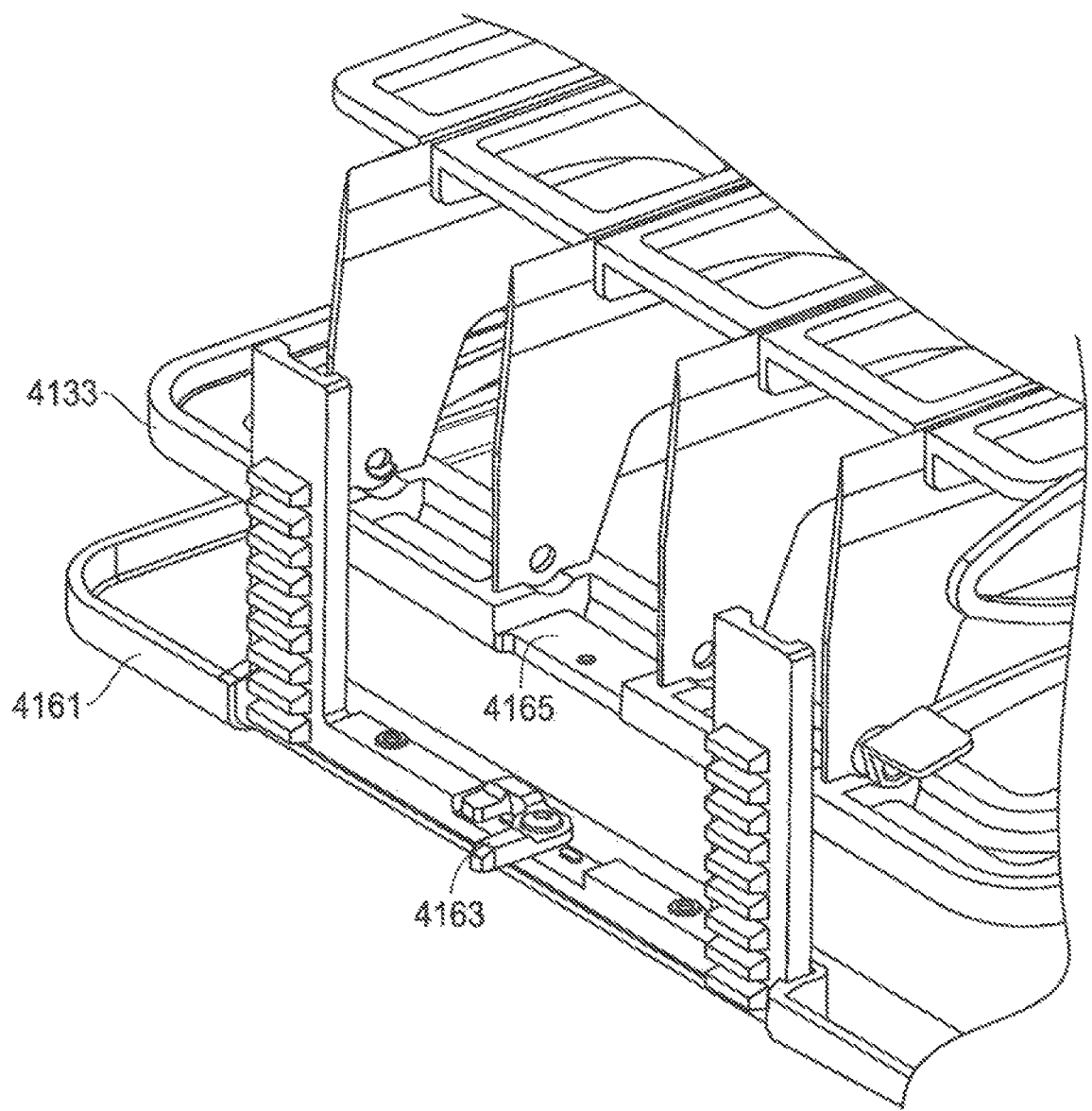

In some versions, the grid of blades 35, 37 may be releasably attachable to the cutter 31. For example, the cutter 31 may include a frame 61 (FIGS. 7-9). In an example, the base 33 may be attachable to and releasable from the frame 61. In some versions, the base 33 may be attached to the frame 61 with a latch 63. In a particular example, the latch 63 may be located on the frame 61. The base 33 may be provided with a recess 65 for receiving the latch 63, as shown. The latch 63 may be spring-biased to a locked position (FIG. 9, solid lines). The latch 63 also may be manually released to an unlocked position (FIG. 9, phantom lines). Some versions of the cutter 31 may include a latch 63 on each end of the frame 61. FIGS. 41 and 42 depict an alternate embodiment of the base 4133, frame 4161, latch 4163 and recess 4165 in locked and unlocked positions, respectively.

Figure 10:
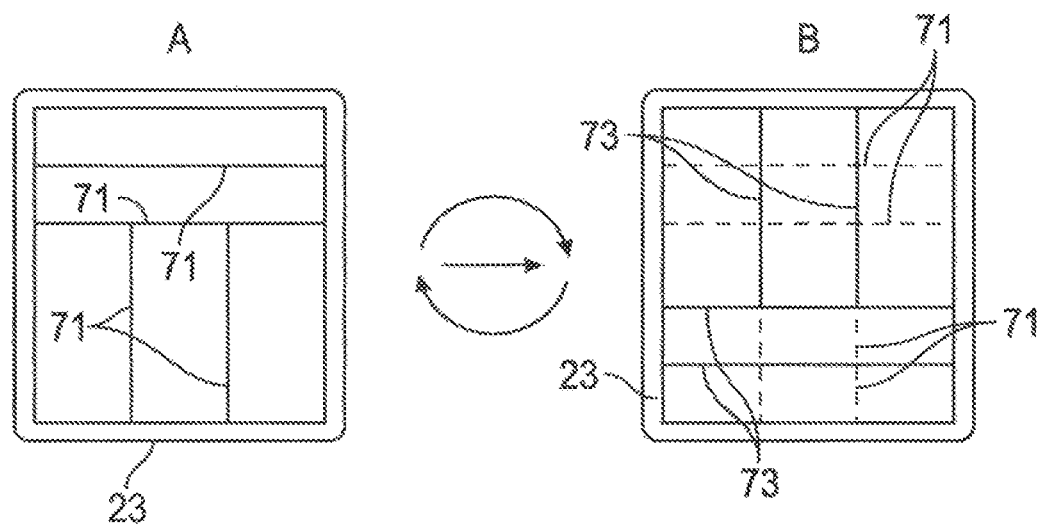
FIGS. 10A and 10B are schematic diagrams illustrating an embodiment of first and second sets of food cuts that may be made by the food cutting system.

In operation, the cutter 31 may include a first cut position in the pan 23. In the first cut position, the cutter 31 may be configured to make a first set of cuts 71 (FIG. 10A) in the food. In addition, the cutter 31 may be repositioned to a second cut position in the pan 23 that differs from the first cut position. In the second cut position, the cutter 31 is configured to make a second set of cuts 73 (FIG. 10B, solid lines) in the food after the first set of cuts 71 (shown in phantom, in FIG. 10B). The second set of cuts 73 may differ from the first set of cuts 71. In one example, the cutter 31 or the pan 23 of food may be rotated 180 degrees (relative to each other) to enable the cutter 31 to make the second set of cuts 73. In the examples of FIGS. 10A and 10B, the cutter 31 makes the two sets of cuts 71, 73 to cut the food into square shapes. Many other food shapes may be cut, depending on the application.

In some embodiments, the food cutting system 21 may further comprise means for moving the cutter 31 between the first cut position and the second cut position. For example, the cutter 31 may be pivotally mounted to the pan 23, such that it can quickly, easily and precisely rotate between the cut positions. The means for moving the cutter 31 between the cut positions may include a knob handle that rotates to actuate and move the cutter 31 relative to the pan 23.

Figure 11:
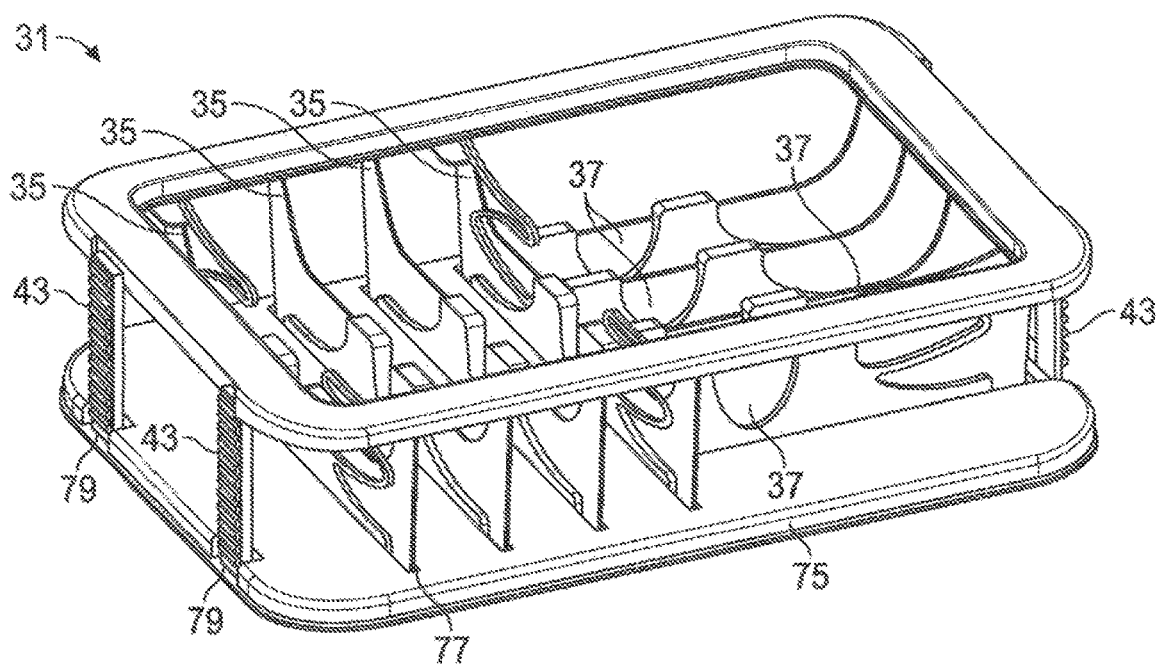
FIG. 11 is a top isometric view of an embodiment of a countertop rest for the cutter.

One version of the food cutting system 21 may further include a countertop rest 75 (FIG. 11). The countertop rest 75 is configured to retain the cutter 31 when the cutter 31 is not mounted to the pan 23. In an example, the countertop rest 75 may include blade recesses 77 for protecting the blades 35, 37 when the cutter 31 is not in use. Additionally, the countertop rest 75 also may include recesses 79 for the racks 43 of the cutter 31.

Figure 12:
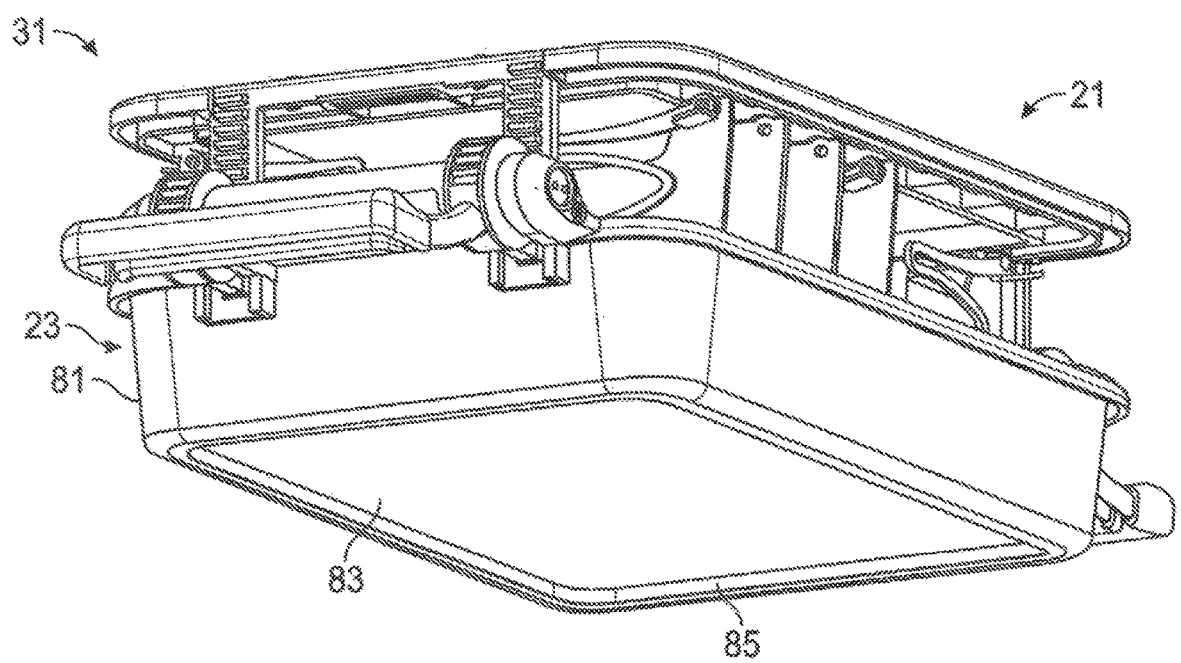
FIG. 12 is a bottom isometric view of an embodiment of the food cutting system.
Figure 13:
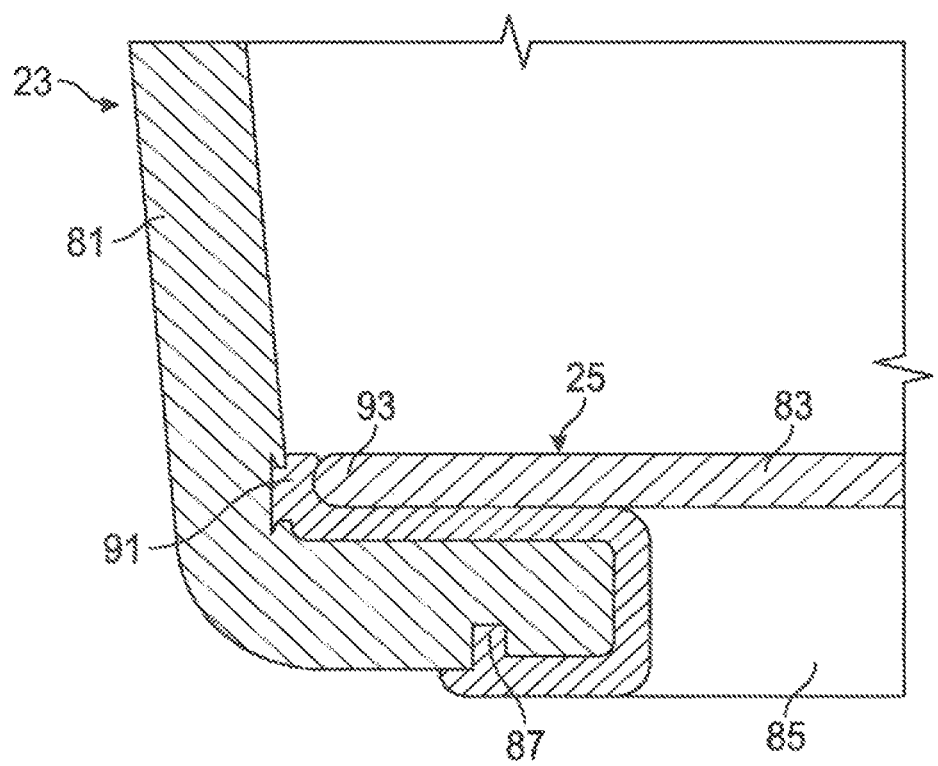
FIG. 13 is an enlarged, sectional side view of an embodiment of a corner portion of a pan.

Referring now to FIGS. 12 and 13, embodiments of the pan 23 may comprise a number of forms. For example, pan 23 may include a pan body 81 and a false bottom 83 configured to be removably mounted to the pan body 81. Alternatively, the pan 23 may be integrally formed as a single component. The false bottom 83 may include a smooth bottom 25 (FIG. 1), or blade recesses, which are not shown but analogous to blade recesses 77 (FIG. 11) in countertop rest 75. Such blade recesses may be configured to allow the blades 35, 37 to completely penetrate the food during cutting, without damaging the cutting edges 39 of blades 35, 37 at a greatest depth of insertion. In some versions, the blades 35, 37 may be configured to not contact the bottom 25 of the pan 23 while cutting food.

Embodiments of the pan 23 may include a gasket 85. For example, gasket 85 may be configured to be located between the pan body 81 and the false bottom 83. Embodiments of the gasket 85 may include a lip 87 (FIG. 13) on a lower portion thereof. Lip 87 may be provided for enabling the gasket 85 to self-align with an opening 89 in the pan body 81. In addition, the gasket 85 may include an over-molded lip 91 on an upper portion thereof. The over-molded lip 91 may be used to provide a slight interference fit with the false bottom 83, such that the false bottom 83 snaps into place in the pan body 81. In some versions, the false bottom 83 may be configured to be reversible, and may be provided with a round edge 93. In an example, the false bottom 83 may be provided with a blades recesses on one side, and a smooth bottom surface 25 on an opposite side.

FIGS. 44A and 44B depict another embodiment of a pan 4423 having a gasket 4485. The gasket 4485 may be configured to be located between the pan body 4481 and the false bottom 4483. The gasket 4485 may circumscribe a perimeter of the false bottom 4483. Gasket 4485 may provide a slight interference fit between the pan body 4481 and the false bottom 4483.

Figure 14:
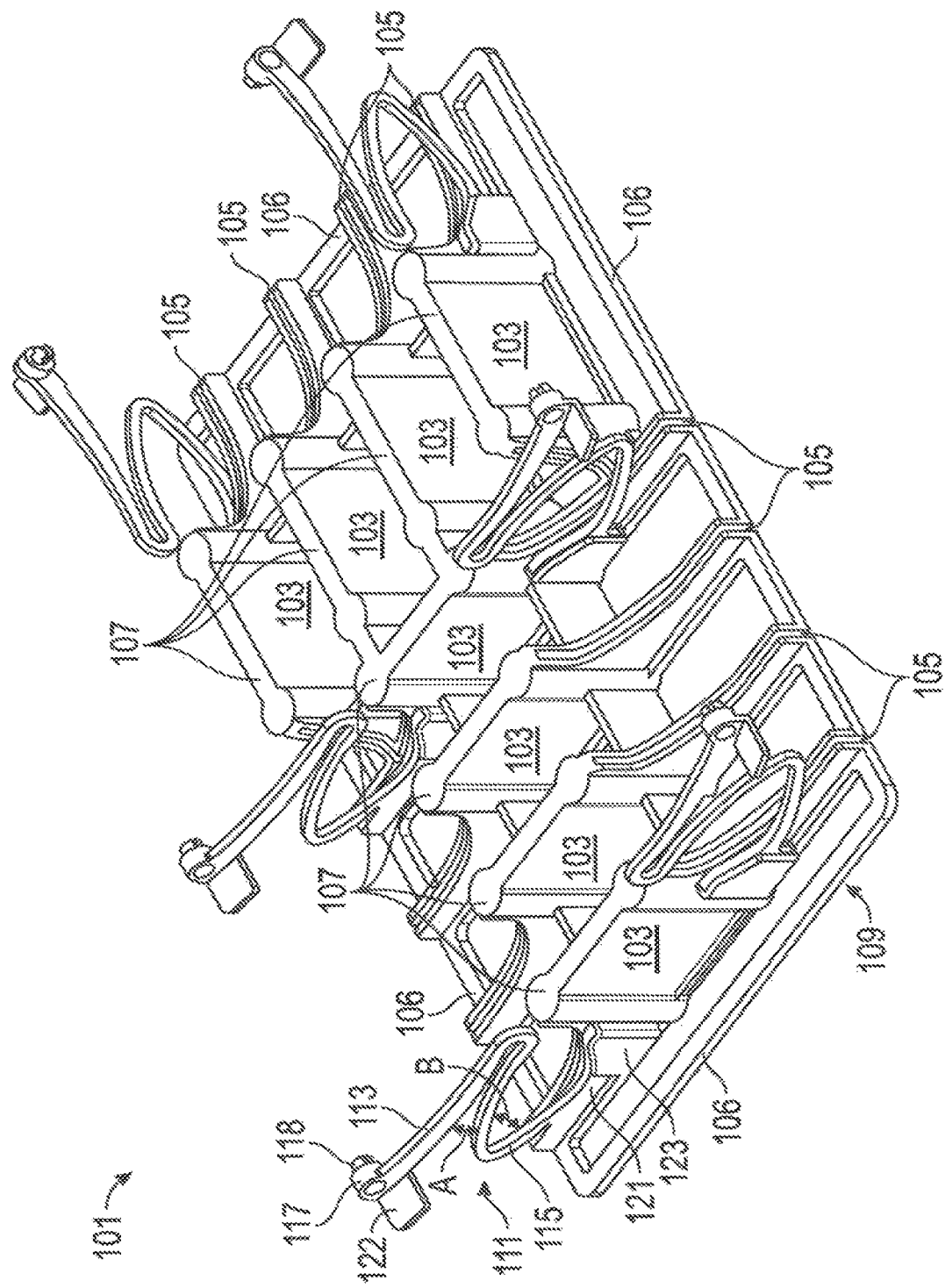
FIG. 14 is a top isometric view of an embodiment of a food press.

Embodiments of the food cutting system 21 may further include a press 101 (FIG. 14). Examples of the press 101 may be coupled to the cutter 31. The press 101 may be configured to retain food in the pan 23 as the blades 35, 37 are removed from the food after cutting the food. In some versions, the cutter 31 may comprise a metallic material, the press 101 may comprise a polymer, and the gasket 85 may comprise silicone. Versions of the press 101 may include a plurality of sleeves 103. Each of the sleeves 103 may define a slot 105. Each slot 105 may be configured to slidingly receive one of the blades 35, 37. In an example, a perimeter 106 of the press 101 may surround and interconnect the sleeves 103. Each of the sleeves 103 may include a mechanical stop 107 for limiting travel of the press 101 relative to the blades 35, 37. For example, the mechanical stops 107 may be located in interior upper surfaces of the sleeves 103. The mechanical stops 107 can be substantially co-planar, and may limit downward travel of the press 101 relative to the blades 35, 37.

In addition, the press 101 of the food cutting system 21 may include a lower surface 109. The lower surface 109 can be substantially planar and configured to contact an upper surface of the food when the blades 35, 37 are cutting the food, and when the blades 35, 37 are being removed from the food.

Embodiments of the press 101 may include one or more spring elements or springs 111. The springs 111 may be configured to bias the press 101 in a vertically downward direction away from the base 33. Embodiments of the food cutting system 21 may include springs 111 that are generally S-shaped, as shown. For example, the S-shaped springs 111 may be vertically oriented and substantially orthogonal to each other. Versions of the S-shaped springs 111 may include a first portion 113 that defines a first angle A, and a second portion 115 that defines a second angle B that is greater than the first angle A. The first portions 113 may be located above the second portions 115, in an example.

Versions of the springs 111 may be coupled to the base 33 (FIG. 5), such as via blades 35, 37. Embodiments of upper portions 117 of the springs 111 may be mounted to a respective one of the blades 35, 37. In an example, each of the upper portions 117 may include a pin 118 (FIGS. 5 and 14) that snaps into a hole 120 in one of the blades 35, 37. In addition, the upper portions 117 may include pull tabs 122, to aid in removal of the upper portions 117 from a respective one of the blades 35, 37. Lower portions 121 of the springs 111 may be mounted to a body 123 of the press 101. The body 123 of the press 101 may include the sleeves 105 for respective ones of the blades 35, 37. In an example, each of the lower portions 121 of the springs 111 may be mounted to the body 123 adjacent to a respective sleeve 105.

In operation of the food cutting system 21, the springs 111 may include a non-cutting position (FIGS. 1, 2, 5 and 12) wherein the springs 111 are fully extended. In the non-cutting position, the press 101 may cover the blades 35, 37 when the blades 35, 37 are not cutting the food. In addition, the springs 111 may include a cutting position (FIGS. 3 and 4) wherein the springs 111 are at least partially compressed, if not substantially fully compressed. In the cutting position, the blades 35, 37 may extend at least partially from the press 101 when the blades 35, 37 are cutting the food. In some versions, the lower surface 109 (FIG. 14) of the press 101 may be approximately co-planar with or slightly cover the cutting edges 39 of the blades 35, 37.

Still other embodiments of the food cutting system 21 may include the pan 23 with its bottom surface 25 (FIG. 1) configured to support food. The cutter 31 may be configured to be mounted to the pan 23 and cut food. The cutter 31 may include the base 33 with a first cutter portion 131 (FIG. 2) on one side of the base 33. The first cutter portion 131 may include the first set of blades 35 oriented in a first direction. The base 33 also may include a second cutter portion 133. The second cutter portion 133 may be separated from and adjacent to the first cutter portion 131 on another side of the base 33. The second cutter portion 133 may include the second set of blades 37 oriented in a second direction that differs from the first direction.

In addition, the cutter 31 may have a first cut position in the pan 23, wherein the cutter 31 may be configured to make a first set of cuts 71 (FIG. 10A) in the food. The cutter 21 may have a second cut position in the pan 23 that differs from the first cut position, wherein the cutter 31 may be configured to make a second set of cuts 73 (FIG. 10B) in the food after the first set of cuts 71. The second set of cuts 73 may differ from the first set of cuts 71. The first set of cuts 71 may be substantially perpendicular to the second set of cuts 73.

Embodiments of a method of cutting food may include providing a pan 23 with food; mounting a cutter 31 to the pan 23 in a first cut position and making a first set of cuts 71 (FIG. 10A) in the food; reorienting the cutter 31 relative to the pan 23 and remounting the cutter 31 to the pan 23 in a second cut position that differs from the first cut position and making a second set of cuts 73 (FIG. 10B) in the food that differs from the first set of cuts 71. The method may include actuating a mechanism to move the cutter 31 from the first cut position to the second cut position. The method also may include manually removing the cutter 31 from the pan 23, manually reorienting the cutter 31 in the second cut position, and then manually securing the cutter 31 to the pan 23. Further, the method may include disposing the cutter 31 such that it is not spring-biased relative to the pan 23. In addition, the method may provide the pan 23 and the cutter 31 to be configured to engage each other and provide leverage therebetween to force the blades 35, 37 into and out of the food. Each of these steps may be performed manually with no power assistance of any kind.

Embodiments of the food cutting grid of blades 35, 37 may be manufactured from stainless steel, aluminum or other food safe materials that are rigid, durable and can repeatedly cut foods without readily dulling. The grid may be coated in a food safe, non-stick material that allows the user to place it over food on a container or pan, such as a baking sheet or pan, press down and cut the food in a single action.

Embodiments of the grid may comprise a plurality of food safe, flat strips that are approximately one or more inches tall by about 12 inches long or less. These dimensions may vary based on the size of the pan in which the grid is designed to fit. The strips used to form the grid may be manufactured in the form of an integral grid or as independent strips that are joined together to form the grid (e.g., with food safe solder, rivets, clamps, screws, etc.). Again, the entire device, or only the grid, may be coated in a food safe, non-stick material.

Some embodiments are well suited for applications such as cookie cutters for bar-shaped cookies. These designs allow users to cut bar-shaped cookies in a quick, easy and professional manner. The cutter provides uniformity in size and an enhanced appearance to the cookie bars. Either before or after baking, the user may place the cutter on the dough or baked food in the cookie sheet or baking pan and press the cutter down into it to cut and form the bars.

For example, some embodiments of a cutter employ baking pans having dimensions or sizes such as 15×10×2, 13×9×2, 8×8×2 inches, etc. Cutters may be respectively deployed with such baking pans for providing grid patterns having dimensions for the portions of food they cut, such as 1×3 (e.g., toffee bars, etc.), 3×4¾ (e.g., lasagna, casserole), 1½×1½ (e.g., petit four) and 1×2½ inches (e.g., larger bar cookies), and 2×2 inches (e.g., brownies, lemon squares, etc.). These are only a few examples of suitable applications.

The devices with such dimensions also may be provided for other guide and blade embodiments. Such designs also may incorporate a loaf pan application for foods such as banana bread, cranberry bread, etc. One type of standard loaf pan is 9×5×3 inches, and the cutting guide slots may be positioned at, for example, one-half inch intervals along the sides of the pan.

In still other embodiments, a food cutting system comprises a pan having a lower surface adapted to support food. A cutter may be unattached to the pan and may include a base and a plurality of transverse blades that define a grid extending from the base and sized to complement the pan. The grid may include an upper end with edges, most or all of which are located in the base. The grid may comprise a lower end with cutting edges adapted to cut food. The upper end may be a variety of shapes, with the lower end flat. Ends of the blades may define a perimeter of the cutter, with the blades being orthogonal to each other in some forms, or configured to use with round pans or still other shapes of pans. Alternatively, the base may define a perimeter of the cutter.

The base may be formed from a smooth rigid material. Surfaces of the base may be covered or coated with a soft pliable material. A lower surface of the base may have a grid-like, rectilinear array of slots in which an upper end portion of the grid may be mounted. The cutting edges may be configured as straight, triangular points, zig-zag, serrated, etc., depending on the shape and texture desired for the edges of the cut food.

The pan may comprise a frame and a false bottom that seats on a lip on a bottom of the frame, with the false bottom being adapted to support the food on the lower surface of the pan. Alternatively, the bottom may be integral with the pan as is commonly known. The pan may have substantially vertical walls that are complementary in shape to the blades of the grid.

In still other embodiments, both the cutter and the pan may include handles that are pivotable at each longitudinal end thereof for engaging each other and to provide leverage between the cutter and the pan for forcing the blades into and out of the food. Each handle may be pivotally mounted on a hinge to a respective longitudinal end, with the hinges of the cutter located adjacent upper ends of the pan. Each cutter handle may comprise a bracket that is offset from a respective hinge. Each bracket may include an offset grip relative to the hinge. Each pan handle may comprise a canted design, and may terminate in a loop.

Some embodiments of a food cutting system may include indicia that depict a shape of the blade and cutting edge. The cutter may have alignment grooves for aligning the cutter with reference marks located on the pan.

Figure 16:
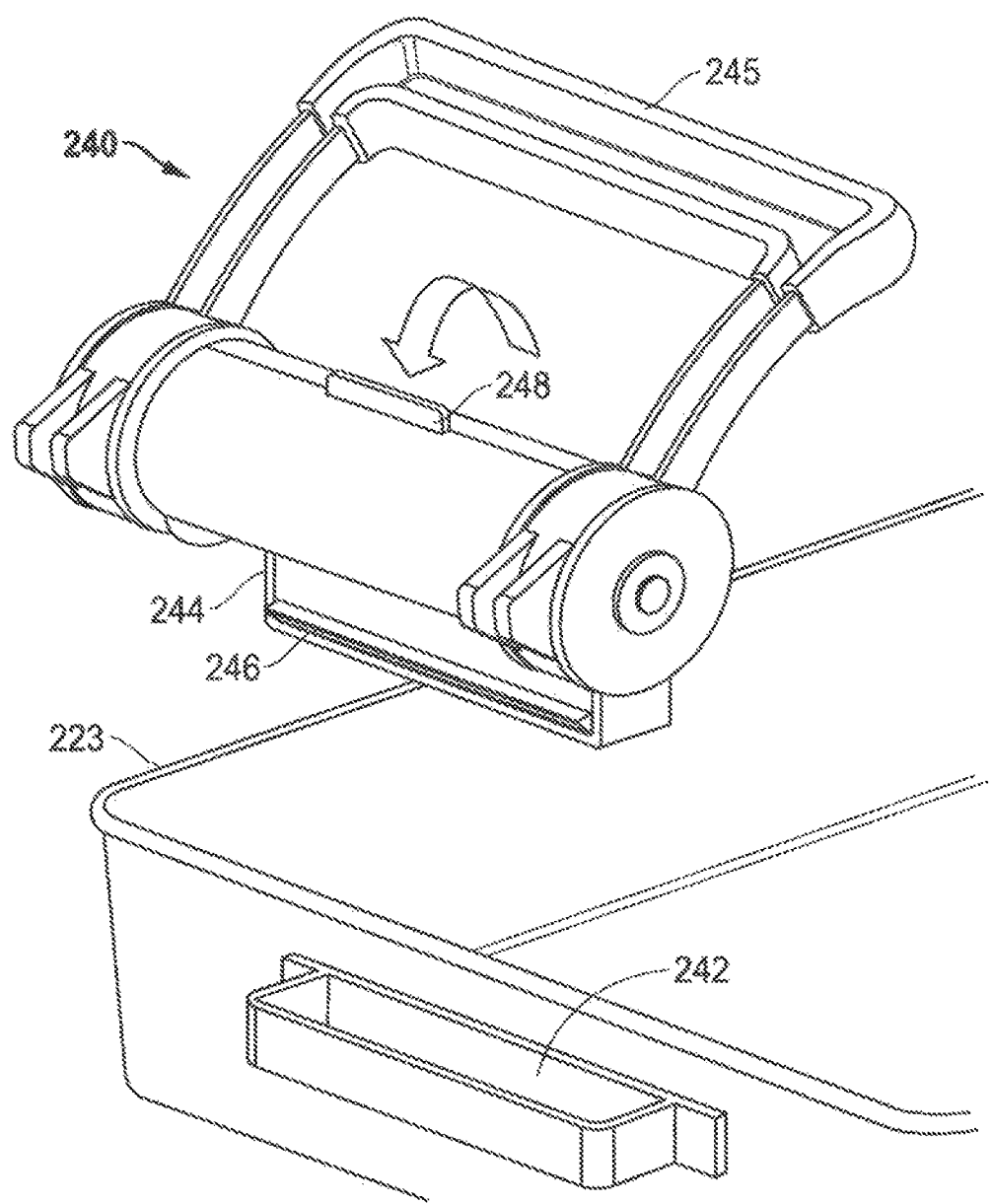
FIG. 16 is an isometric view of an alternate embodiment of a food processing system.
Figure 43:
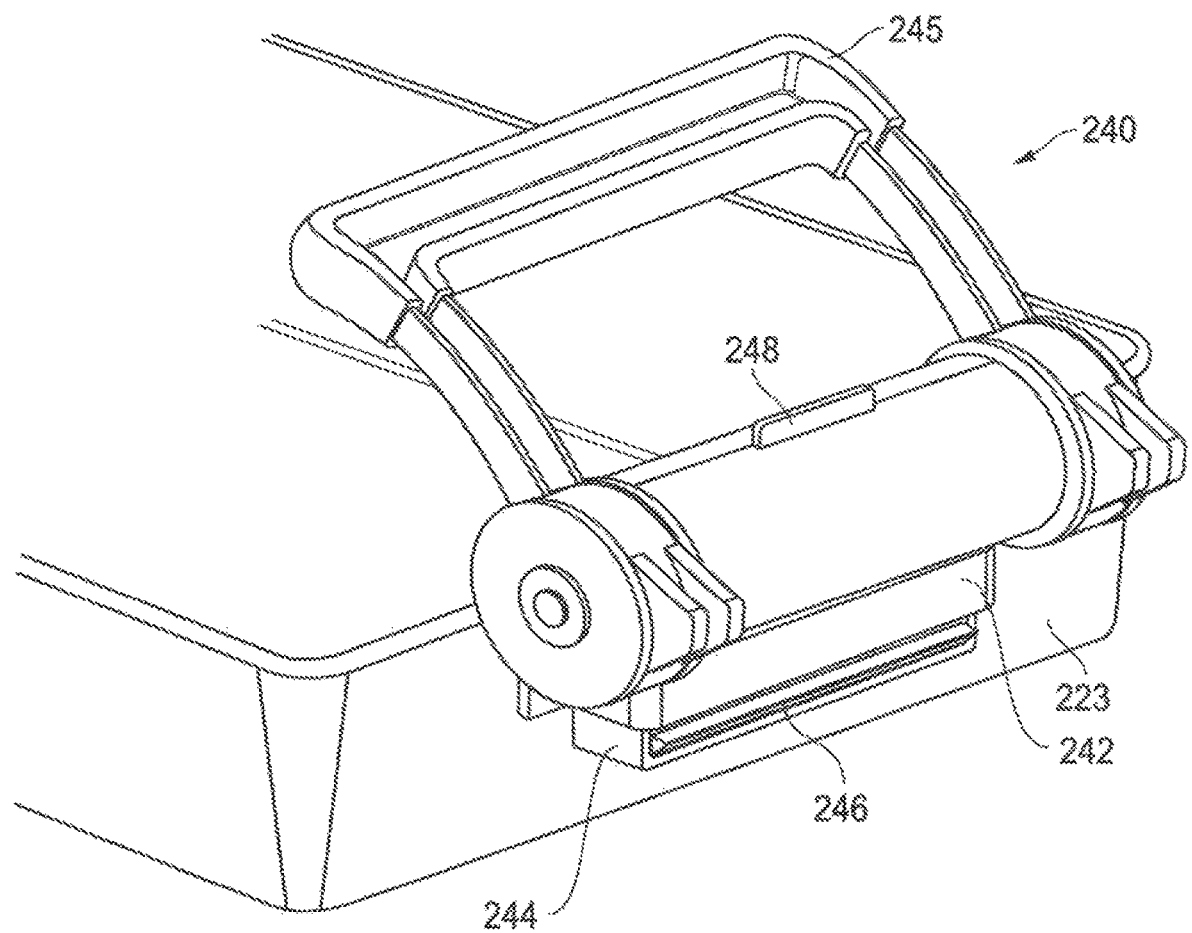
FIG. 43 is a top isometric view of an alternate embodiment of a pan and actuator shown in a connected position.

As shown in FIGS. 16 and 43, some examples of a food processing system may include a pan 223, a cutter (not shown for ease of illustration) as described elsewhere herein, and at least one actuator 240 configured to be releasably attached to the pan 223. The actuator 240 may be configured to move the cutter relative to the pan 223. Versions of the pan 223 may include a receptacle 242 for each actuator 240. Examples of the actuator 240 may include an actuator base 244 that is configured to be releasably secured in the receptacle 242. The actuator 240 also may have a handle 245 that is configured to move relative to the actuator base 244. In addition, the actuator 240 may have at least one pinion (not shown) configured to move a rack (not shown) as described elsewhere herein.

In some embodiments of the food cutting system, at least one of the actuator 240 and the pan 223 may include a snap-in mechanism 246 for releasably securing the actuator 240 to the pan 223. The snap-in mechanism 246 may be configured to provide positive (e.g., audible) confirmation of proper securement of the actuator 240 to the pan 223. In addition, said at least one of the actuator 240 and the pan 223 may include a release mechanism 248 configured to release the snap-in mechanism 246 for releasing the actuator 240 from the pan 223. For example, in one version, the release mechanism 248 may be rotated as shown by the arrow relative to the actuator 240 to allow snap-in mechanism 246 to disengage receptacle 242.

Figure 17:
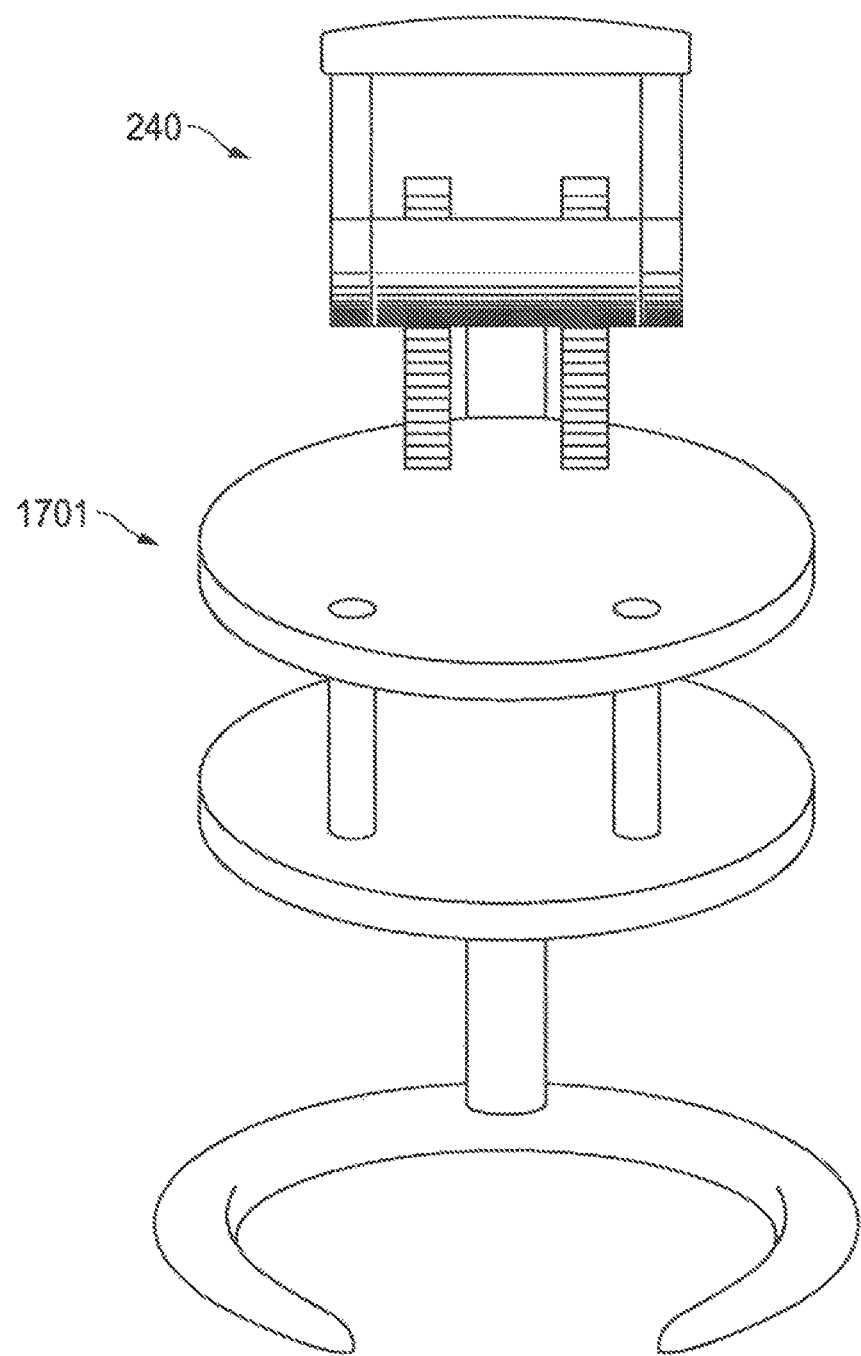
Figure 18:
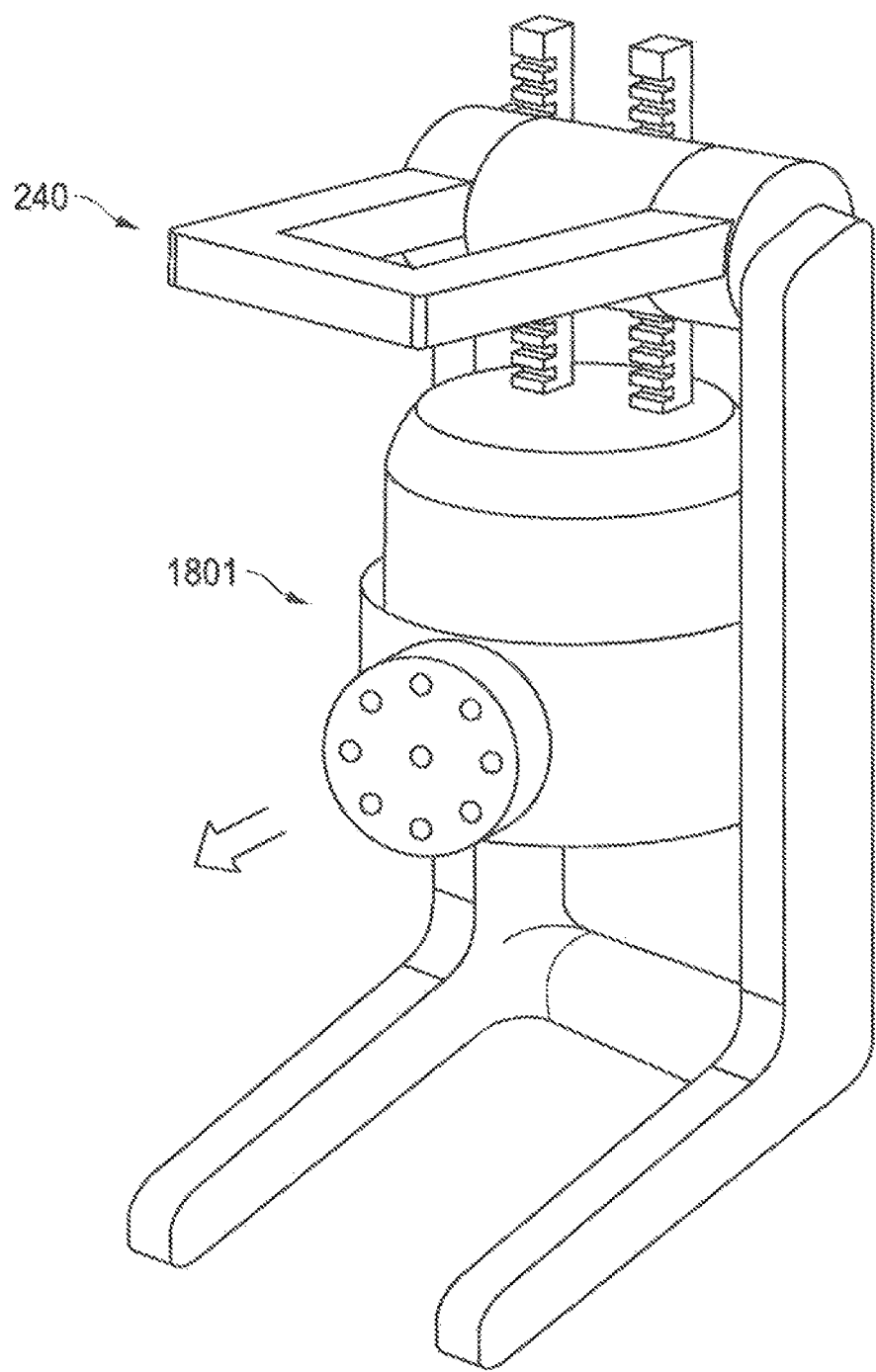
Figure 19:
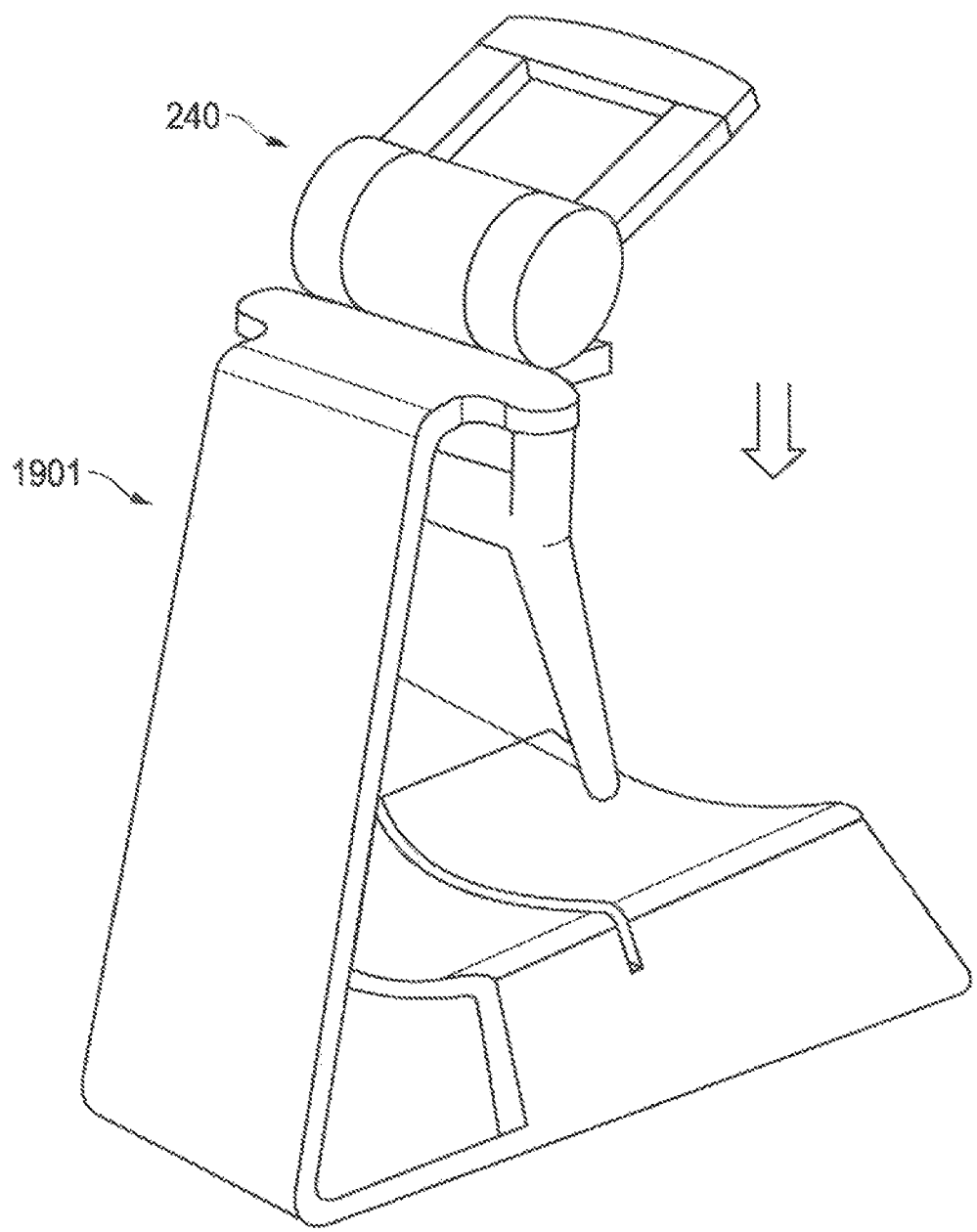
Figure 20:
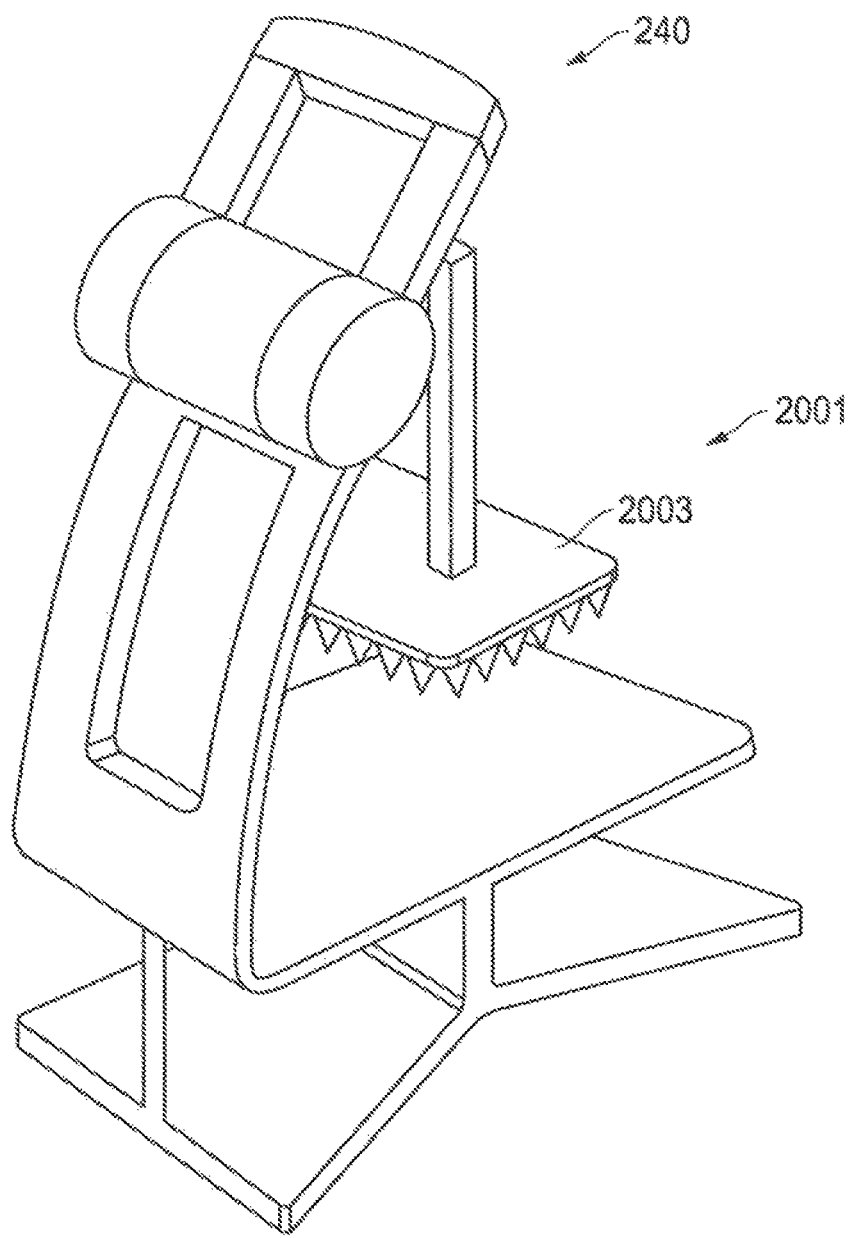
Figure 21A:
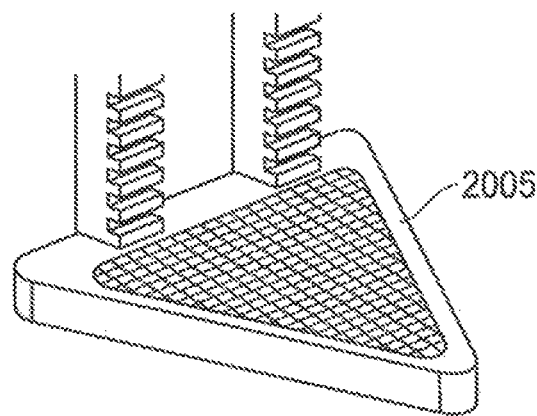
Figure 21B:
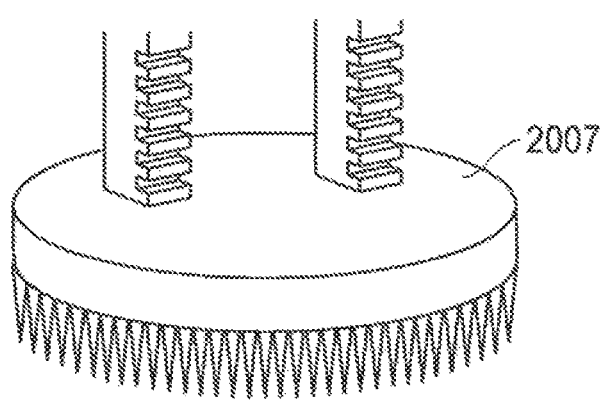
Figure 21C:
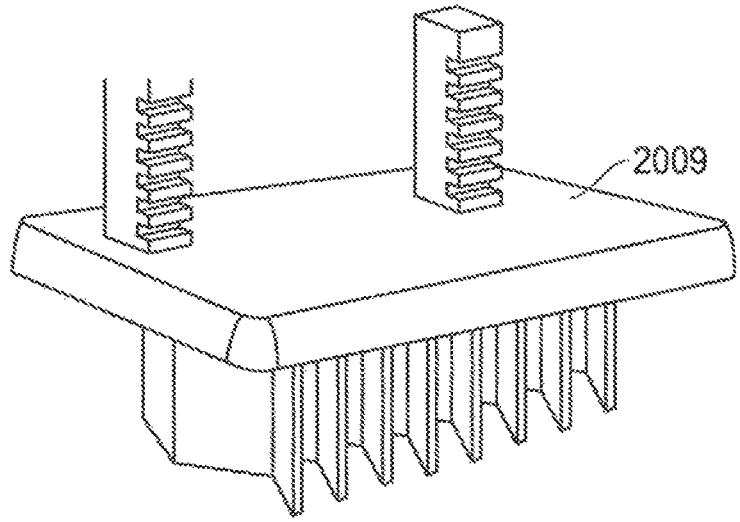

In alternate embodiments, the actuator 240 can be releasably attached to an accessory that differs from the pan 223 for actuation of the accessory. For example, the accessory may comprise one or more of the following items: a dough or tortilla press 1701 (FIG. 17) for forming shaped food items, a pasta extruder or press or meat press 1801 (FIG. 18) which also could be used as a vegetable spiraler or vegetable shredder, a cheese or meat slicer 1901 (FIG. 19) having a cutting wire or blade, or a meat tenderizer 2001 (FIG. 20) with a tenderizer attachment 2003. As shown in FIGS. 21A-21C, the meat tenderizer 2001 may be adapted for other uses as well and utilize various interchangeable attachments such as a shallot/herb press or mincer 2005, a different tenderizer attachment 2007, and a patterned attachment 2009 such as for vegetables or cheese.

Figure 22A:
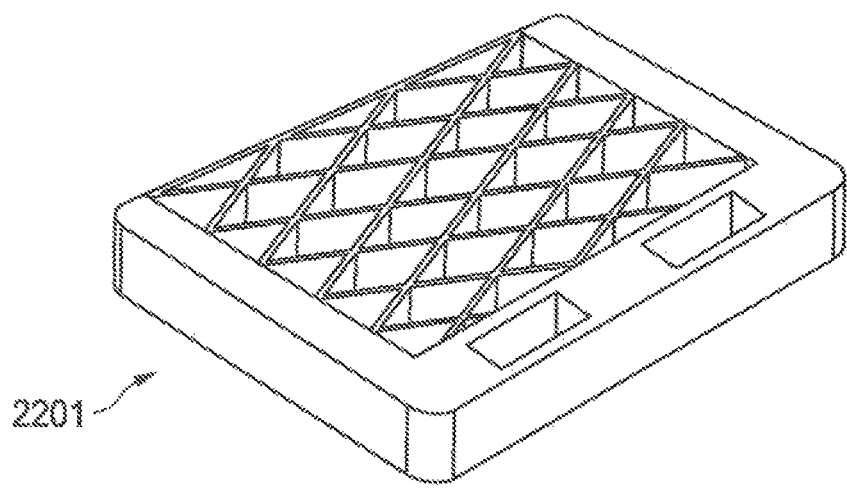
Figure 22B:
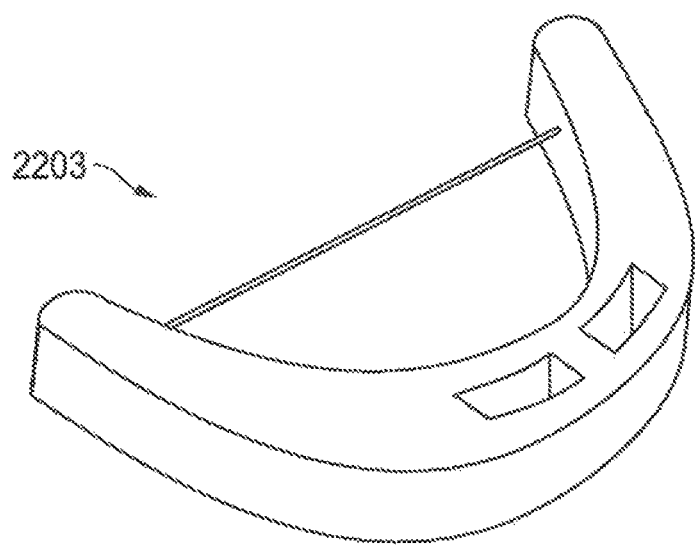
Figures 23A, 23B:
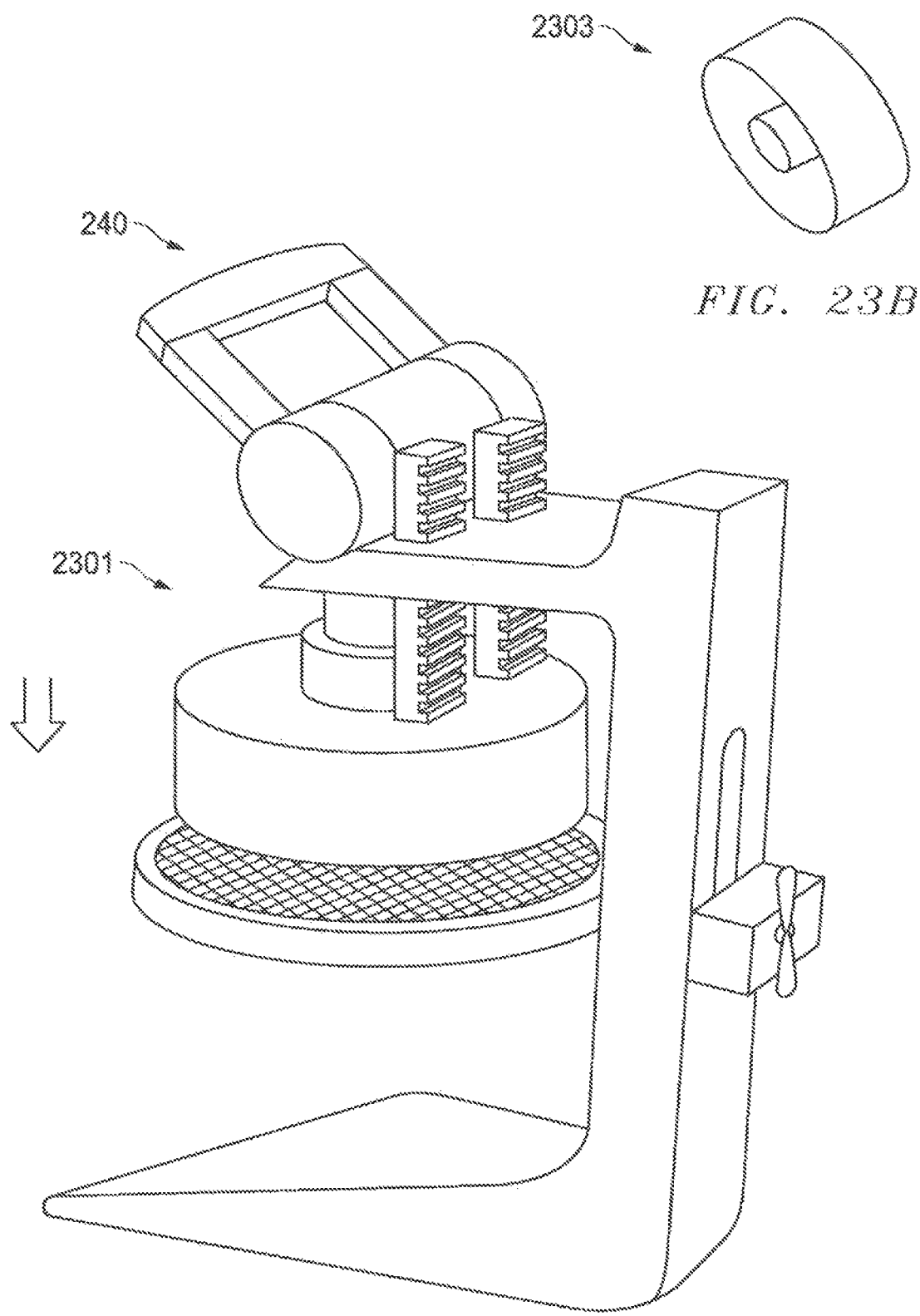
Figure 24:
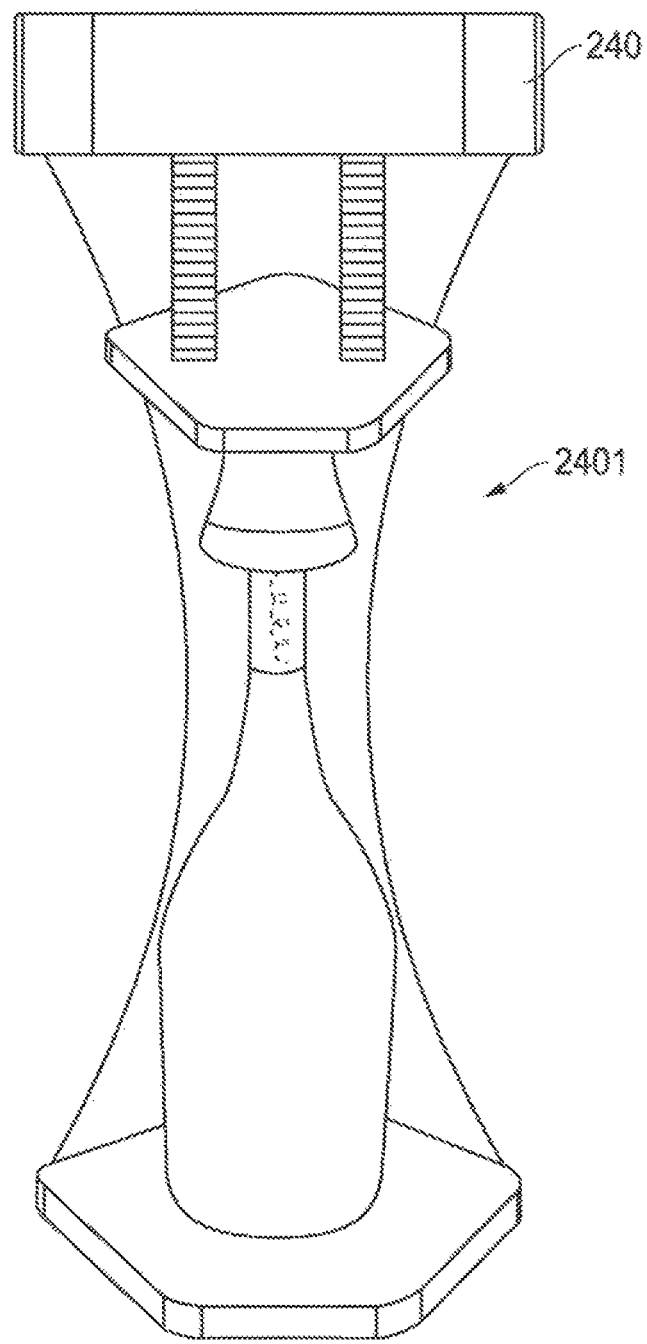
Figure 25:
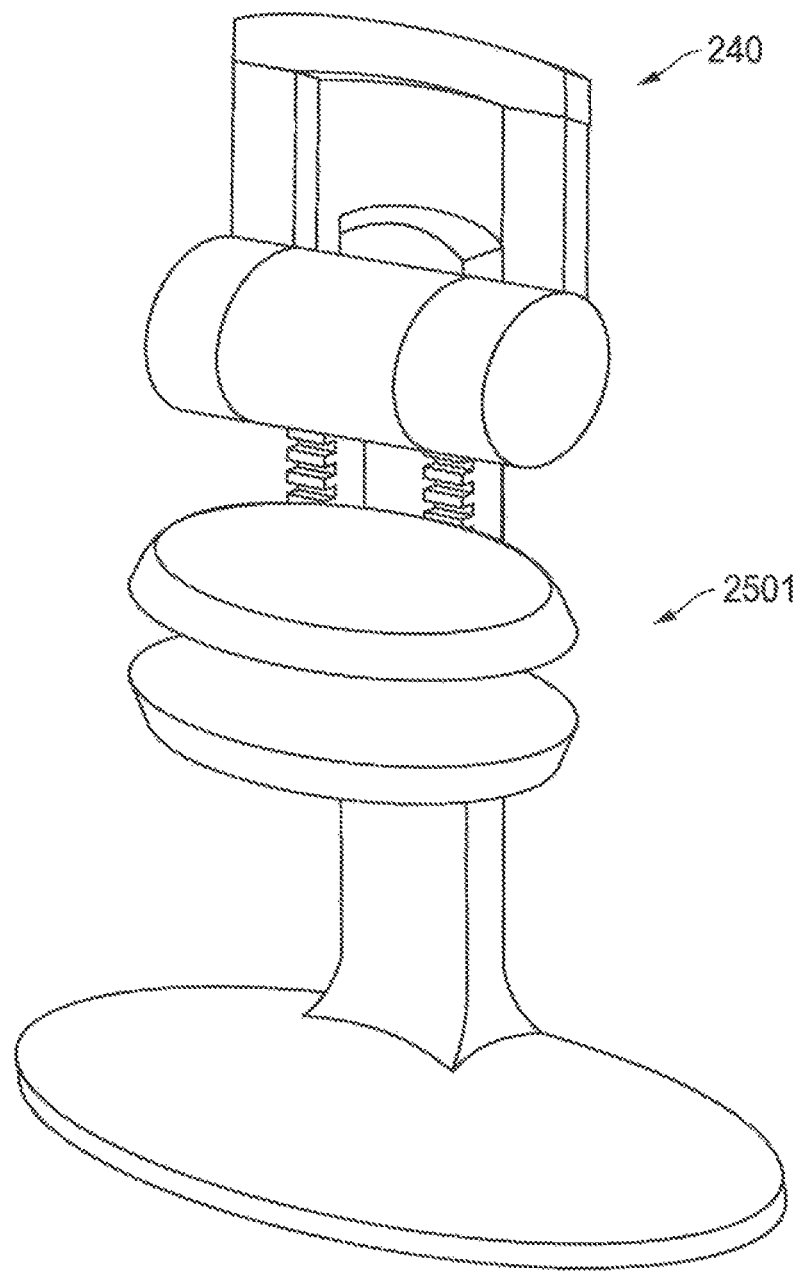
Figure 26:
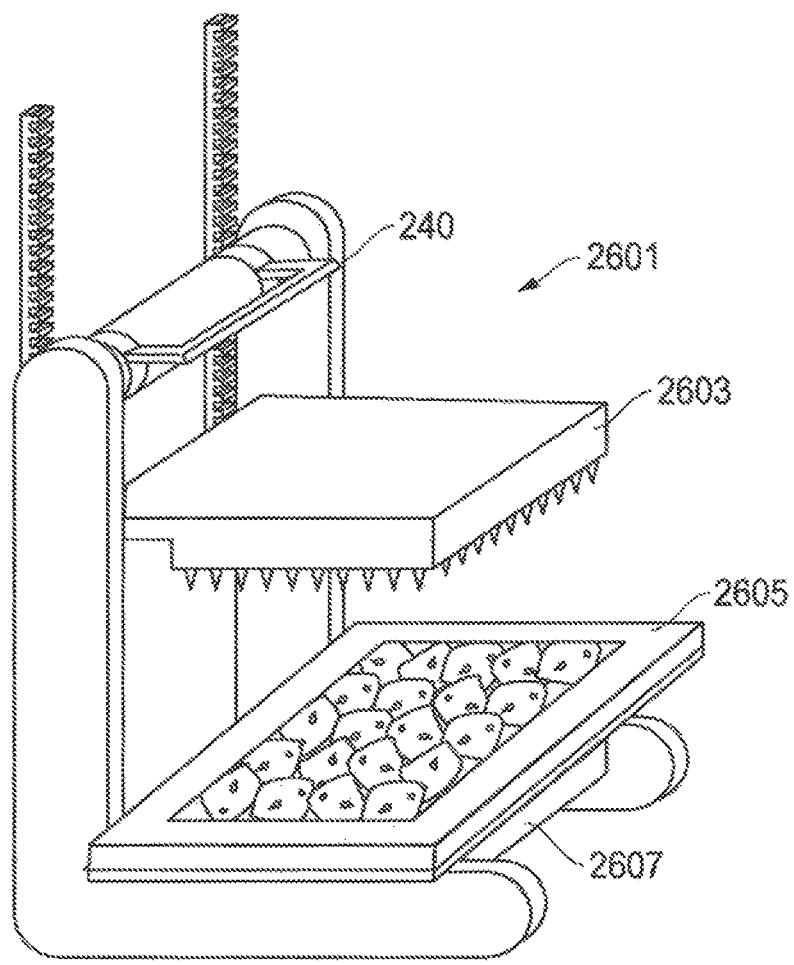
Figure 27:
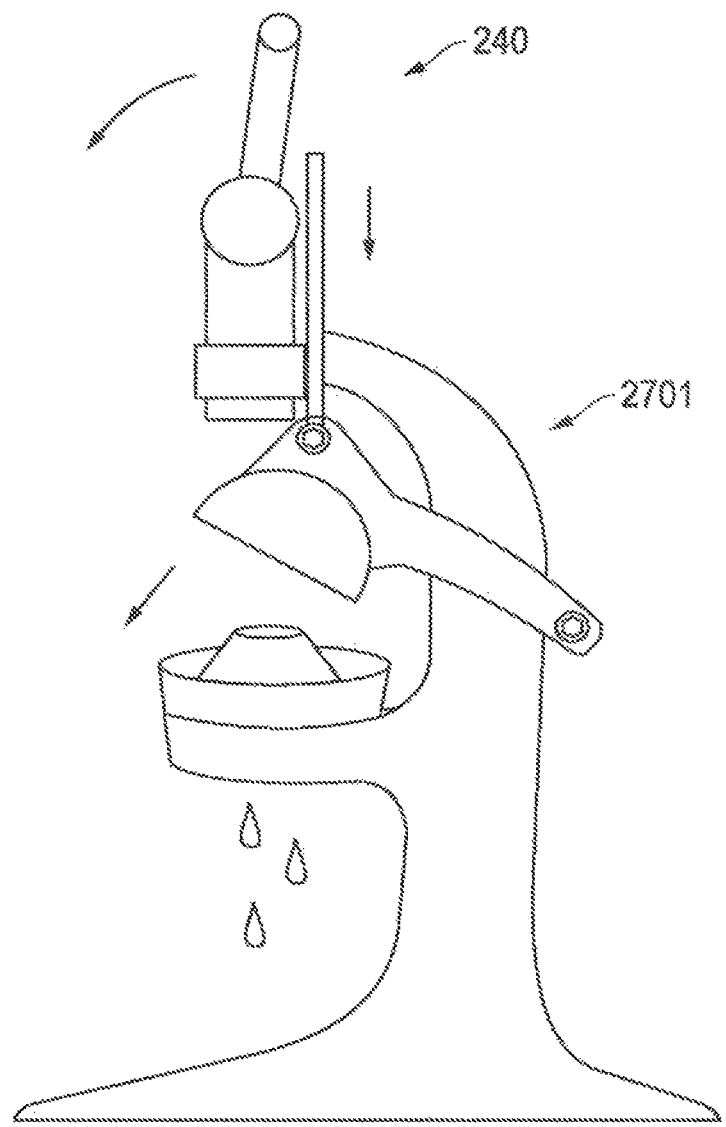
Figure 28:
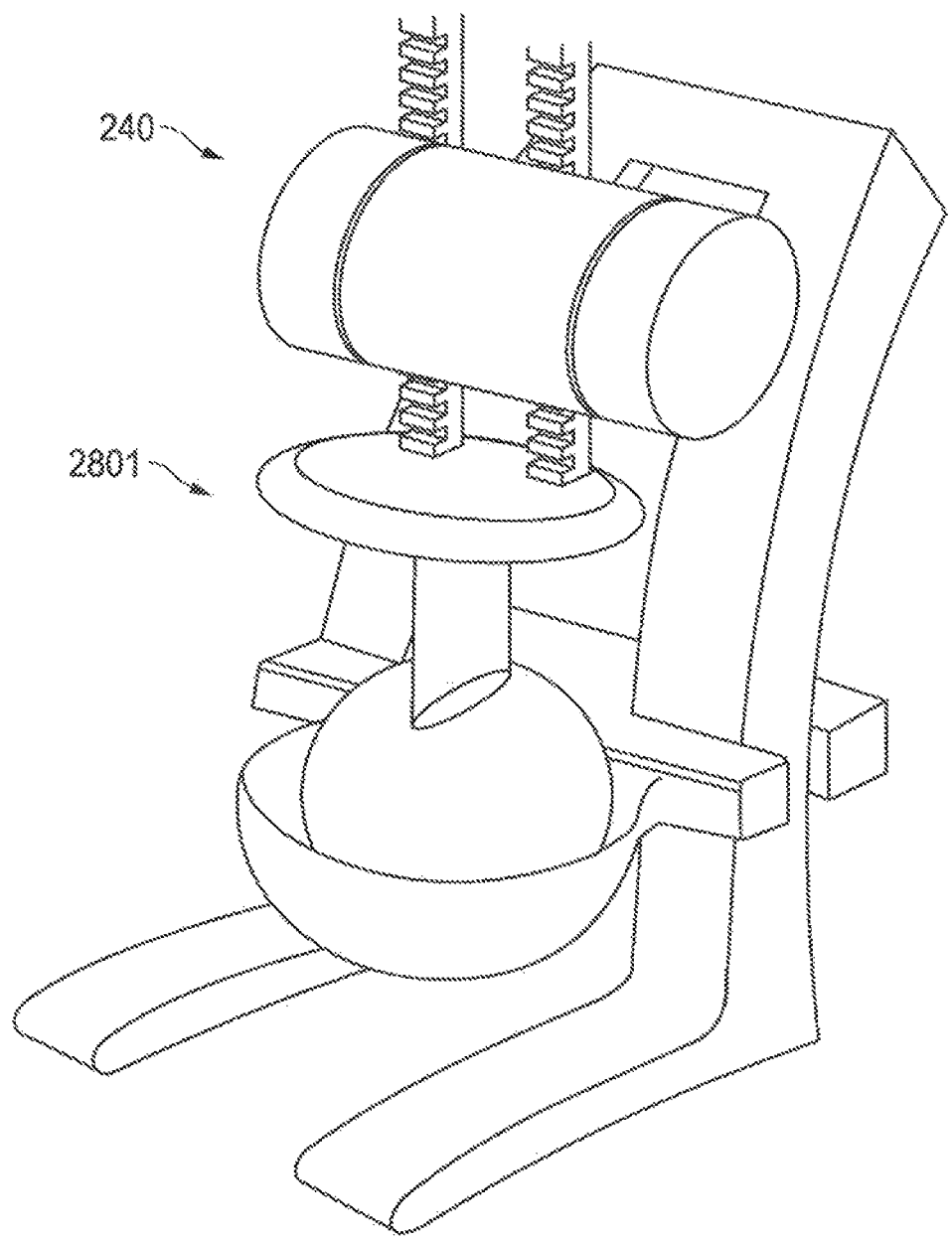
Figure 29:
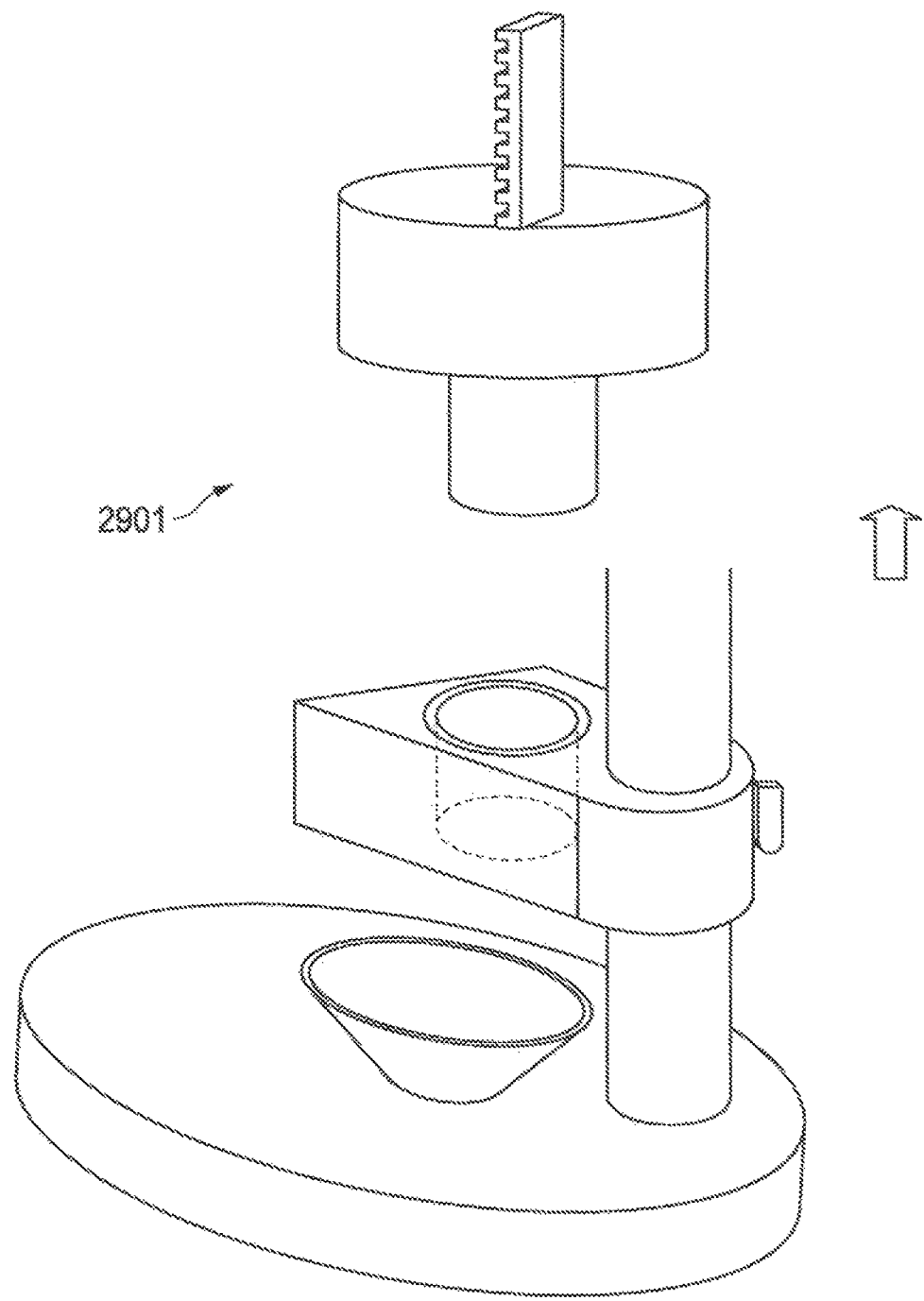
Figure 30:
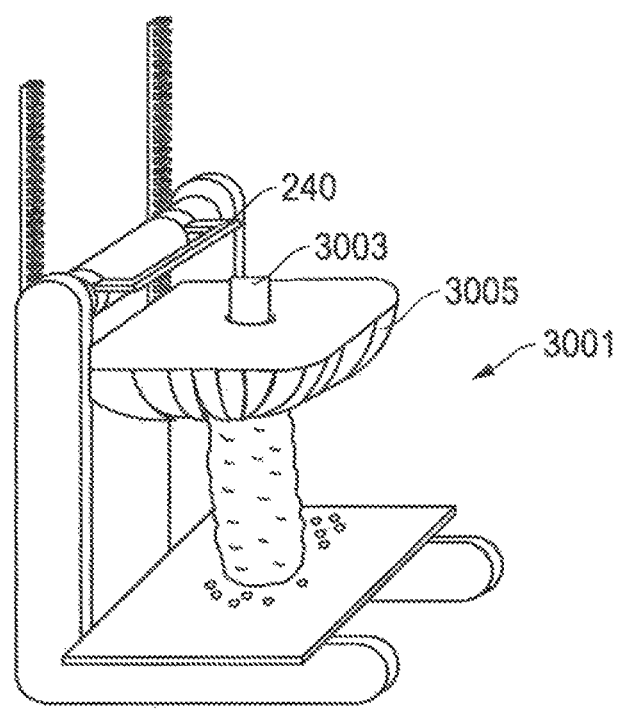
Figure 32:
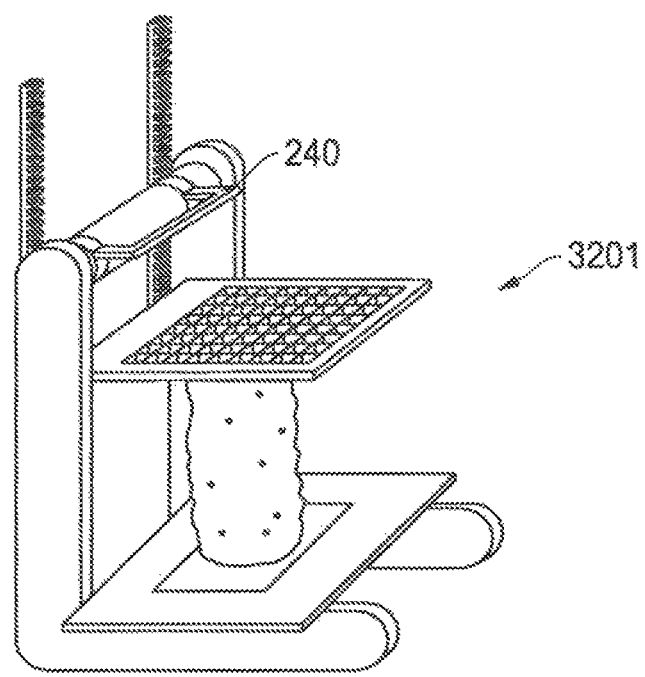
Figure 31:
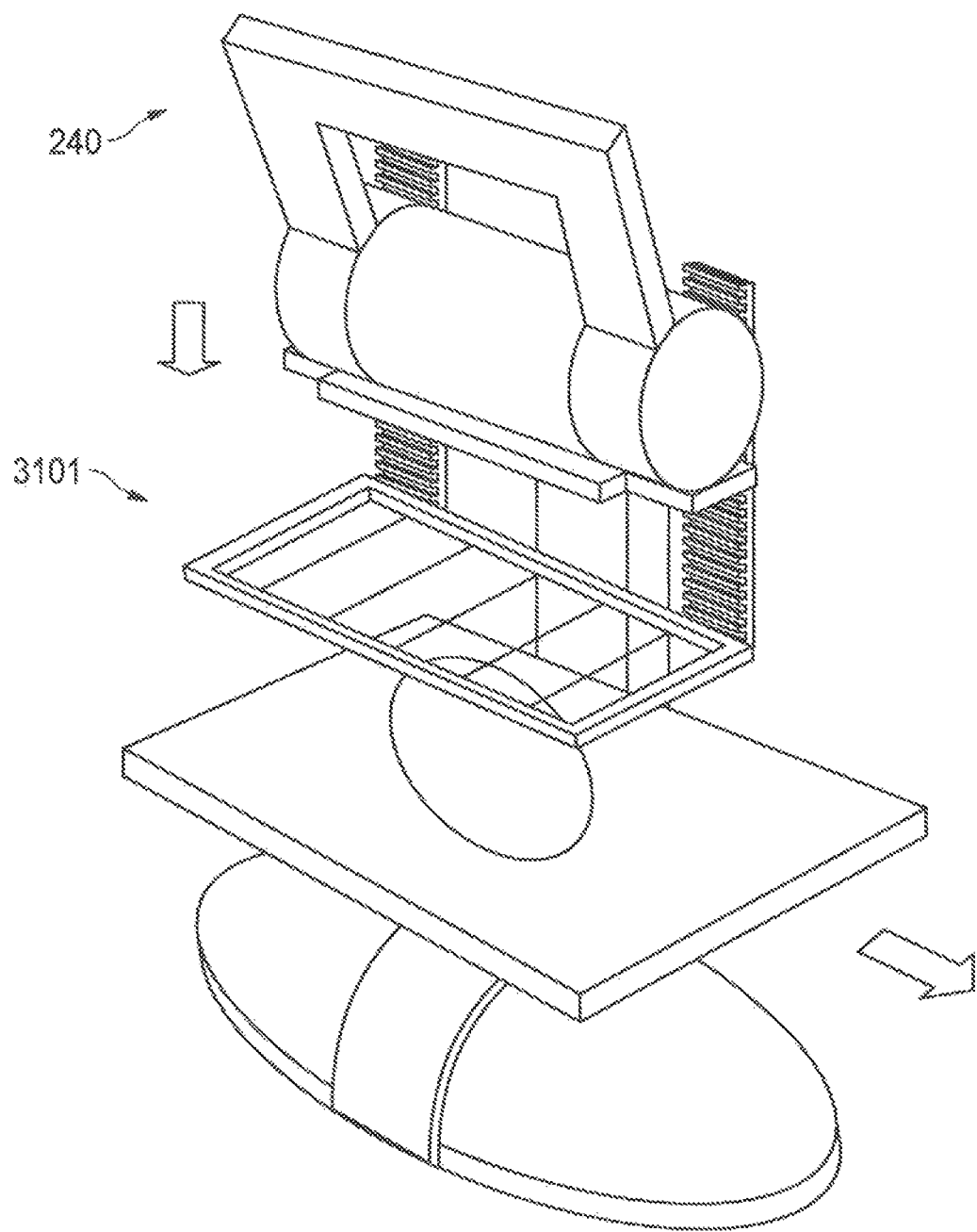

In still other embodiments, the food cutting system may include a potato or vegetable cutter attachment 2201 (FIG. 22A), a cheese slicer attachment 2203 (FIG. 22B), a pizza cutter (FIG. 23), a donut cutter or bagel guillotine 2301 (FIG. 23A) having an interior, removable cutter attachment 2303 (FIG. 23B), a wine bottle opener 2401 (FIG. 24), a nut cracker or can crusher 2501 (FIG. 25), a can opener, an ice crusher 2601 (FIG. 26) including a crusher 2603, container 2605 and ice tray 2607, a fruit juicer 2701 (FIG. 27), a fruit corer or cherry pitter 2801 (FIG. 28), a garlic press 2901 (FIG. 29) having an adjustable height via a twist lock device, a corn shredder 3001 (FIG. 30) having a blade 3003 and a elastomer stop 3005 to hold a cob of corn, a bread or hard-boiled egg slicer 3101 (FIG. 31), a potato french fry cutter 3201 (FIG. 32), a potato peeler, a hard-boiled egg shell peeler, an attachment 3301 for a blender or mixer 3303 (FIGS. 33A-33E), and a bar-in-a-box or baker-in-a-box.

In some embodiments, the actuator 240 may be attached to the accessory in a same way as the actuator 240 attaches to the pan, or in a different way. In addition, the accessory may include at least one of the following additional mechanisms (FIGS. 34A-34F): a gear 3401, a pinion 3403, another rack 3405, a lever 3407, and different types of rotational transfer devices 3409.

Figure 35A:
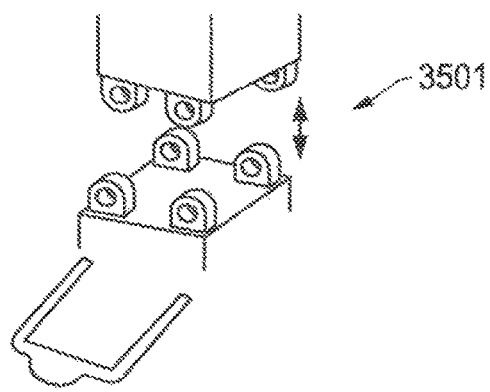
Figure 35B:
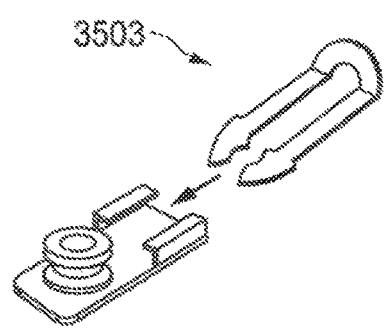
Figure 35C:
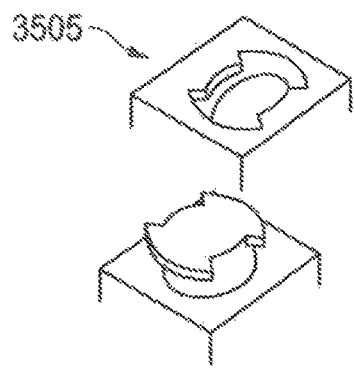
Figure 35D:
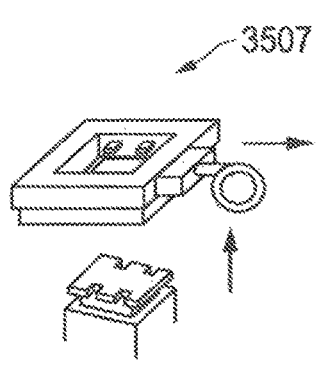
Figure 35E:
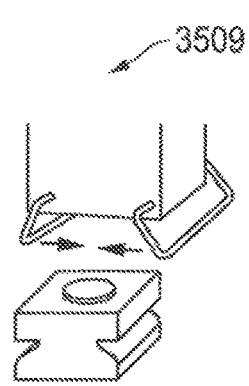
Figure 35F:
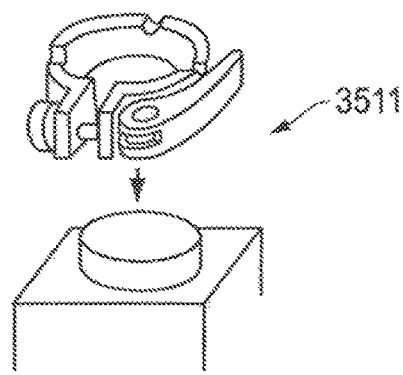
Figure 35G:
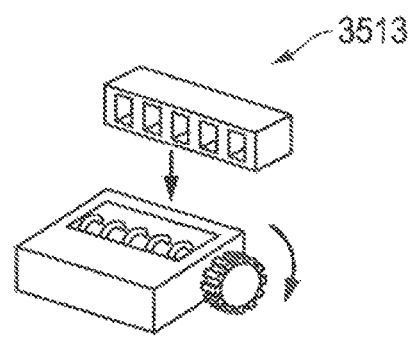
Figure 36A:
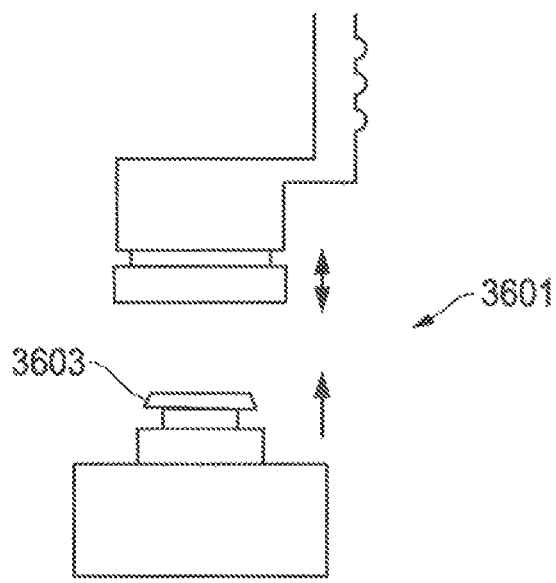
Figure 36C:
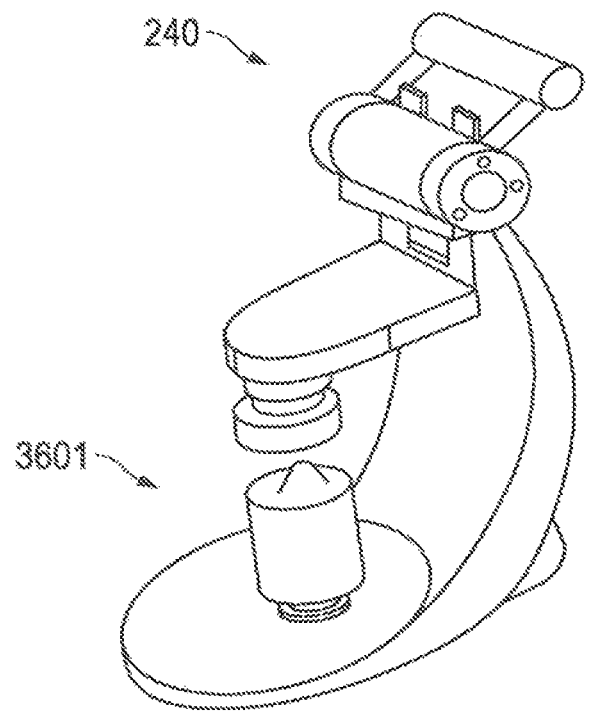
Figure 36B:
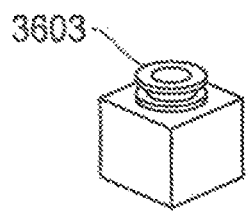
Figure 37A:
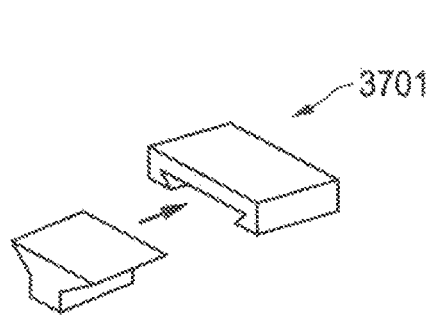
Figure 37B:
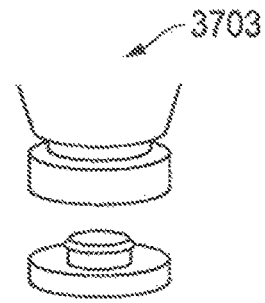
Figure 37C:
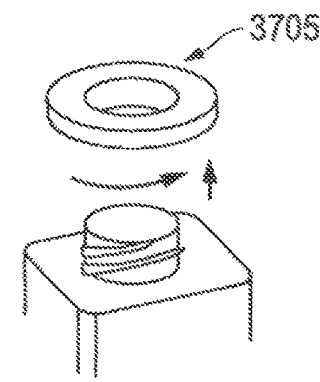
Figure 37D:
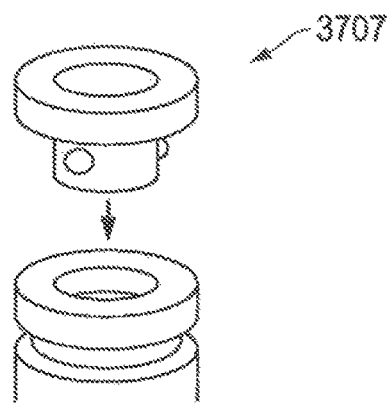
Figure 37E:
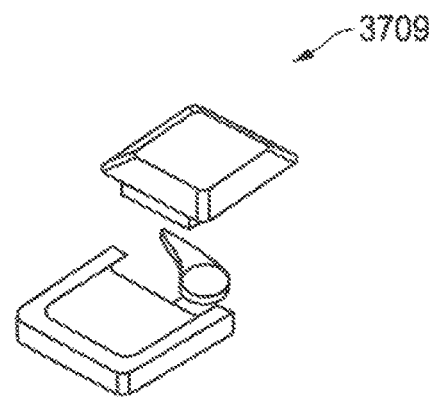
Figure 37F:
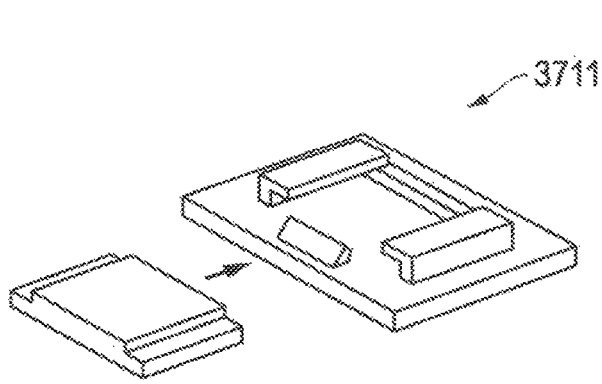
Figure 37G:
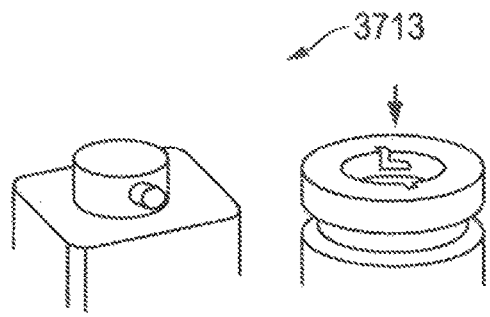

Other embodiments of the actuator 240 may attach to the accessory via at least one of the following items (FIGS. 35A-37G): a removable pin system 3501 (FIG. 35A) in holes of the actuator and the accessory, a slide lock 3503 (FIG. 35B), a rotatable key lock 3505 (FIG. 35C), a custom pull lock 3507 (FIG. 35D), a clip lock 3509 (FIG. 35E), a clamp lock 3511 (FIG. 35F), a twist lock 3513 (FIG. 35G), a rotatable spline lock, a tongue and groove lock, a clamp, a snap ring, a mount connector, a quick-release mechanism 3601 (FIGS. 36A-36C) with lock base 3603, a dove tail 3701 (FIG. 37A), a release ring and snap 3703 (FIG. 37B), a threaded release 3705 (FIG. 37C), a button snap 3707 (FIG. 37D), a cam lock 3709 (FIG. 37E), a shelf release mechanism 3711 (FIG. 37F), or a quarter-turn lock 3713 (FIG. 37G).

Figure 38:
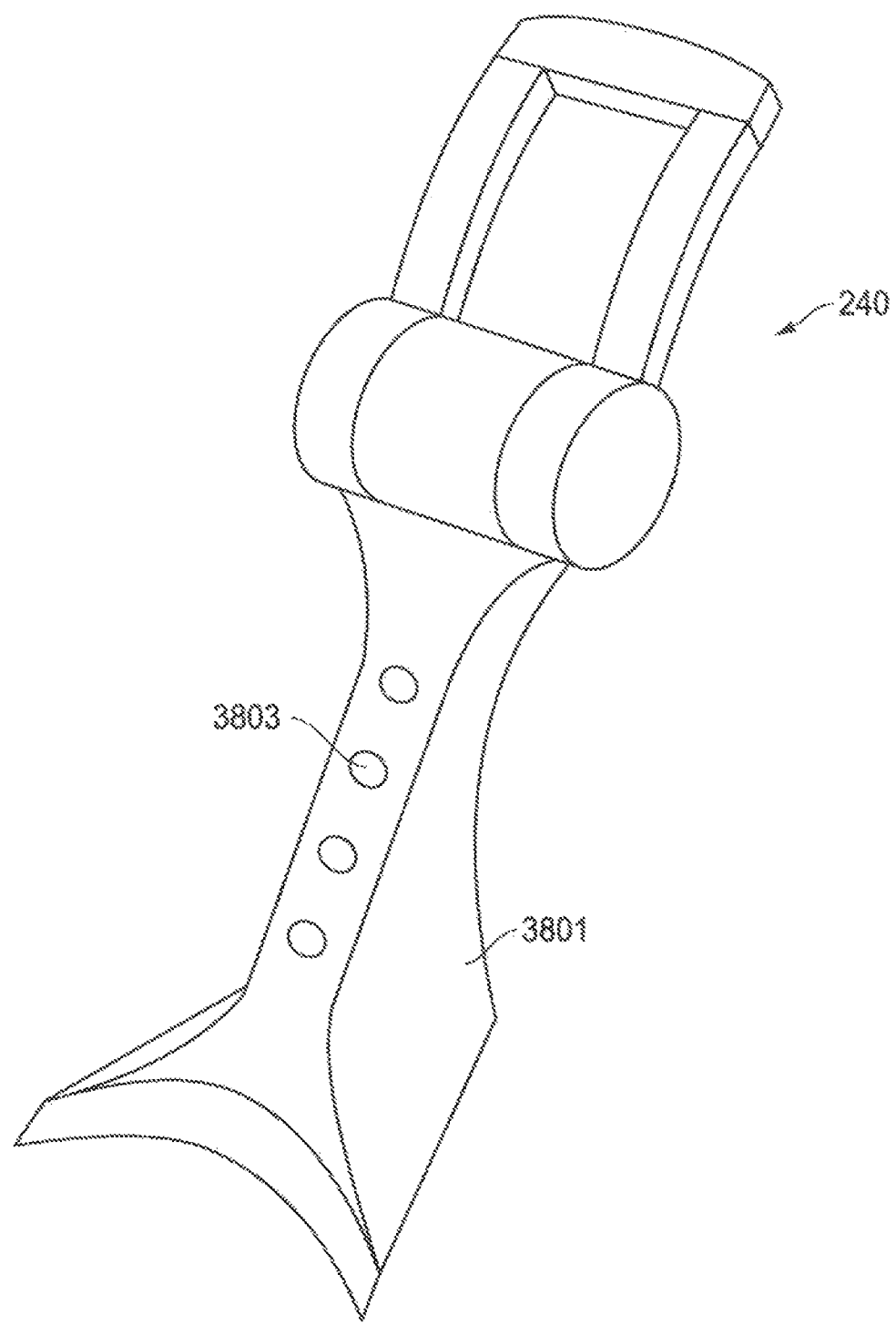
FIGS. 38-40C depict views of still other embodiments of food processing systems.
Figure 39:
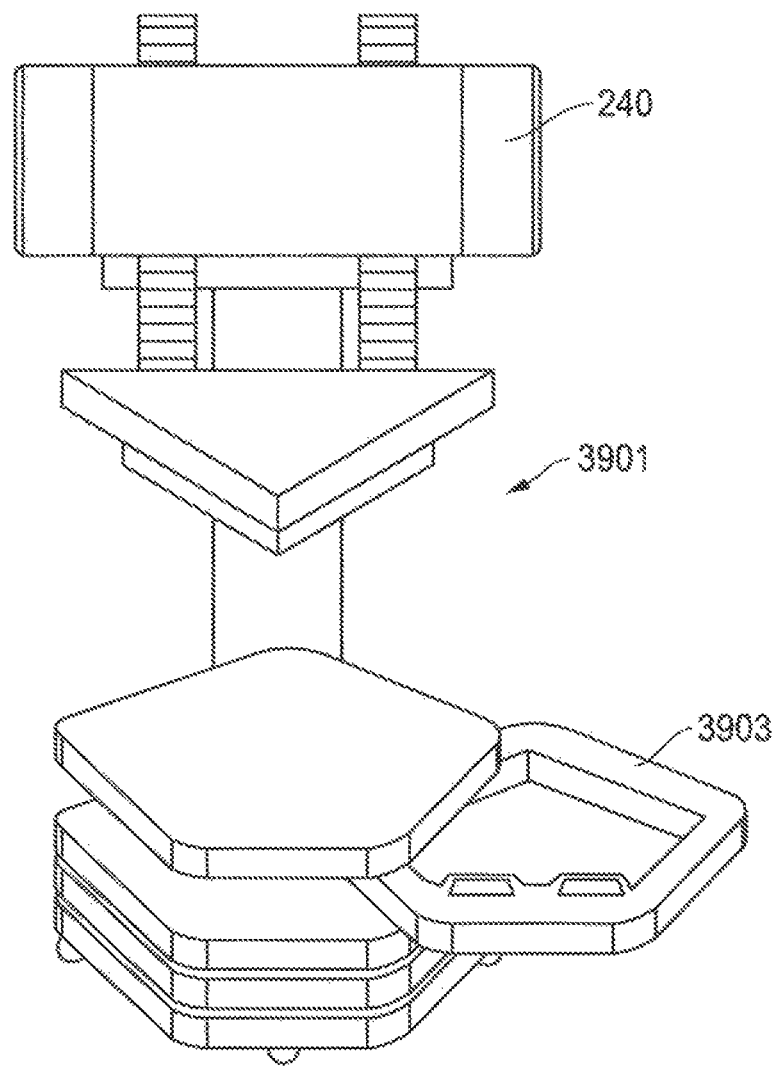

As shown in (FIG. 38), the accessory may include a stand 3801 configured to be releasably attached to the actuator 240. In addition, the accessory may be configured to be adjustably attached to the stand at different elevations, such as via holes 3803. As described herein, the accessory may be configured to be releasably attached to the stand, and a plurality of accessories may be configured to be interchangeably and releasably attached to the stand. Other embodiments (FIG. 39) may include a stand 3901 configured to store the actuator 240 when the actuator 240 is not in use. In addition, the stand 3901 may comprise compartments 3903 configured to store one or more accessories.

Figure 40A:
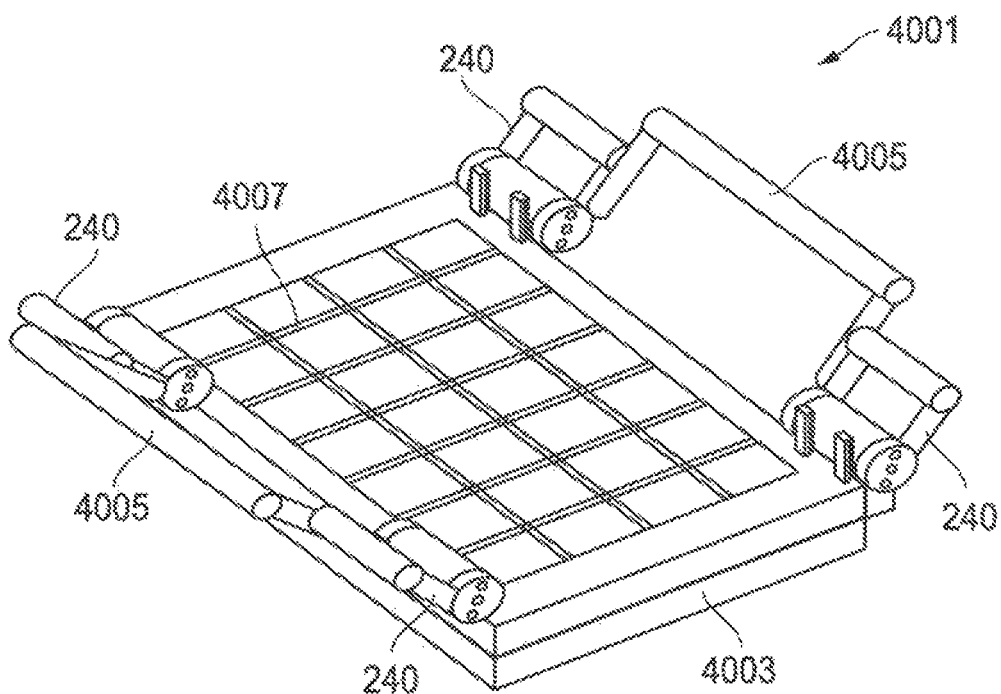
Figure 40B:
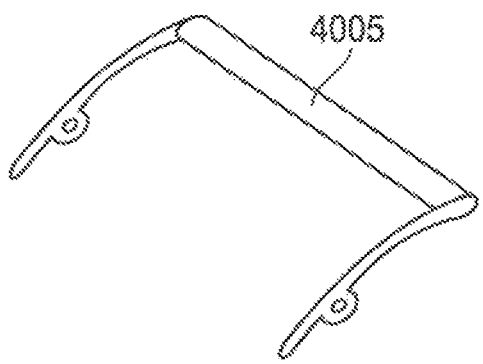
Figure 40C:
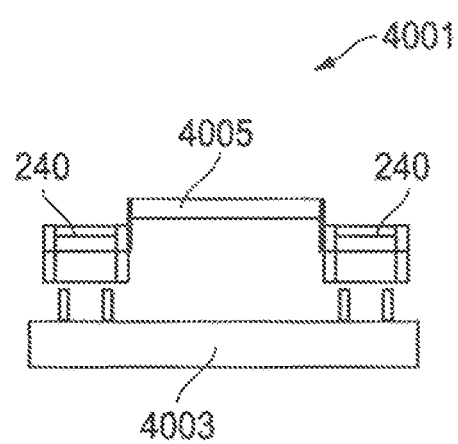

Another embodiment of a food cutting system 4001 (FIG. 40A-40C) may include a plurality of actuators 240. Each actuator 240 may be configured to be individually releasably attached to the pan 4003. The system may include an extended handle 4005 configured to be coupled to the actuators 240, such that the actuators 240 are configured to move the cutter 4007 relative to the pan 4003 in unison via the extended handle 4005.

Embodiments of a food processing system may include a base, a press configured to be releasably mounted to the base, the press having an unactuated position and an actuated position; and a plurality of accessories, each configured to be individually mountable to and releasable from at least one of the base and the press, such that each attachment performs a food processing function when the press is moved from the unactuated position to the actuated position.

Another food cutting system may include a pan having a surface configured to support food; a cutter configured to be mounted to the pan and cut food, the cutter comprises a base with a first cutter portion on one side of the base, the first cutter portion has a first set of cutting elements oriented in a first direction, the base has a second cutter portion separated from and adjacent to the first cutter portion on another side of the base, and the second cutter portion has a second set of cutting elements oriented in a second direction that differs from the first direction; and the cutter comprises a first cut position in the pan wherein the cutter is configured to make a first set of cuts in the food, a second cut position in the pan that differs from the first cut position wherein the cutter is configured to make a second set of cuts in the food after the first set of cuts, and the second set of cuts differs from the first set of cuts. In a version, the first direction can be substantially perpendicular to the second direction.

A method of cutting food may include providing a pan with food; mounting a cutter to the pan in a first cut position and making a first set of cuts in the food; and then reorienting the cutter relative to the pan and remounting the cutter to the pan in a second cut position that differs from the first cut position and making a second set of cuts in the food that differs from the first set of cuts. The final step may include actuating a mechanism to move the cutter from the first cut position to the second cut position, and/or manually removing the cutter from the pan, manually reorienting the cutter in the second cut position, and then manually securing the cutter to the pan. Versions of the cutter may not be spring-biased relative to the pan. Embodiments of the pan and the cutter may be configured to engage each other and provide leverage therebetween to force the cutting elements into and out of the food.

Other versions may include one or more of the following embodiments:

Embodiment 1. A food cutting system, comprising:
 a pan having a surface configured to support food;
 a cutter configured to be mounted to the pan, the cutter comprises a base and cutting elements mounted to the base, and the cutting elements are configured to move relative to the pan to cut food in the pan; and
  a press configured to be coupled to the cutter and configured to retain food in the pan as the cutting elements are removed from the food after cutting the food.

Embodiment 2. The food cutting system of any of these embodiments, wherein the press comprises a plurality of sleeves, each of the sleeves defines a slot, and the slots are configured to receive the cutting elements.

Embodiment 3. The food cutting system of any of these embodiments, wherein a perimeter of the press surrounds and interconnects the sleeves.

Embodiment 4. The food cutting system of any of these embodiments, wherein the sleeves comprise mechanical stops for limiting travel of the press relative to the cutting elements.

Embodiment 5. The food cutting system of any of these embodiments, wherein the mechanical stops are located in interior upper surfaces of the sleeves, and the mechanical stops are substantially co-planar.

Embodiment 6. The food cutting system of any of these embodiments, wherein the press comprises a lower surface that is substantially planar and configured to contact an upper surface of the food when the cutting elements are cutting the food and when the cutting elements are being removed from the food.

Embodiment 7. The food cutting system of any of these embodiments, wherein the press comprises a spring coupled to the base, and the spring biases the press in a vertically downward direction away from the base.

Embodiment 8. The food cutting system of any of these embodiments, wherein the spring comprises a plurality of springs.

Embodiment 9. The food cutting system of any of these embodiments, wherein each of the springs is generally S-shaped.

Embodiment 10. The food cutting system of any of these embodiments, wherein the S-shaped springs are vertically oriented and substantially orthogonal to each other.

Embodiment 11. The food cutting system of any of these embodiments, wherein each of the S-shaped springs comprises a first portion that defines a first angle, and a second portion that defines a second angle that is greater than the first angle.

Embodiment 12. The food cutting system of any of these embodiments, wherein upper portions of the springs are mounted to the cutting elements, and lower portions of the spring elements are mounted to a body of the press.

Embodiment 13. The food cutting system of any of these embodiments, wherein the body comprises sleeves for the cutting elements, and each of the lower portions of the springs is mounted to the body adjacent to a respective sleeve.

Embodiment 14. The food cutting system of any of these embodiments, wherein the spring comprises a non-cutting position wherein the spring is fully extended such that the press covers the cutting elements when the cutting elements are not cutting the food, and a cutting position wherein the spring is at least partially compressed such that the cutting elements extend at least partially from the press when the cutting elements are cutting the food.

Embodiment 15. The food cutting system of any of these embodiments, wherein, in the non-cutting position, a lower surface of the press is approximately co-planar with the cutting elements.

Embodiment 16. The food cutting system of any of these embodiments, wherein the cutter is configured to move relative to the pan via leverage therebetween.

Embodiment 17. The food cutting system of any of these embodiments, wherein the pan comprises a pinion and the cutter comprises a rack, and leverage is provided therebetween by rotating the pinion relative to the rack.

Embodiment 18. The food cutting system of any of these embodiments, wherein the pinion is mounted to a handle, and rotation of the handle is configured to move the cutter vertically into and out of the food.

Embodiment 19. The food cutting system of any of these embodiments, wherein the handle is configured to rotate in an angular range of about 0 degrees to about 180 degrees.

Embodiment 20. The food cutting system of any of these embodiments, wherein the handle has a non-cutting position wherein the handle is rotated outward away from the pan, and the handle has a cutting position wherein the handle is rotated inward toward the pan.

Embodiment 21. The food cutting system of any of these embodiments, wherein the handle has a detent at each of the non-cutting and cutting positions to help retain the handle at said positions.

Embodiment 22. The food cutting system of any of these embodiments, wherein, as the handle moves from the non-cutting position to the cutting position, the racks moves downward and pass between an exterior of the pan and the pinions.

Embodiment 23. The food cutting system of any of these embodiments, wherein the handle has a platform and, in the non-cutting position, the rack may be placed on the platform such that a rack gear tooth on the rack engages a pinion gear tooth on the pinion.

Embodiment 24. The food cutting system of any of these embodiments, wherein the pan comprises two pinions on each end of the pan, the cutter comprises two racks on each end of the cutter, and the two racks on each end are adjacent to two respective pinions when the cutters are mounted to the pan.

Embodiment 25. The food cutting system of any of these embodiments, wherein the handle and pinion form an actuator that is releasably attached to the pan.

Embodiment 26. The food cutting system of any of these embodiments, wherein the actuator is configured to be releasably attached to an accessory that differs from the pan, and the actuator is configured to actuate the accessory.

Embodiment 27. The food cutting system of any of these embodiments, wherein at least one of the actuator and the pan comprises a mechanism for releasably securing the actuator to the pan.

Embodiment 28. The food cutting system of any of these embodiments, wherein the cutter comprises a first cut position in the pan wherein the cutter is configured to make a first set of cuts in the food, a second cut position in the pan that differs from the first cut position wherein the cutter is configured to make a second set of cuts in the food after the first set of cuts, and the second set of cuts differs from the first set of cuts.

Embodiment 29. The food cutting system of any of these embodiments, further comprising a mechanism for moving the cutter between the first and second cut positions.

Embodiment 30. The food cutting system of any of these embodiments, further comprising a second cutter having a different cutting pattern than the cutter.

Embodiment 31. The food cutting system of any of these embodiments, wherein the cutter and the second cutter are interchangeable with the pan.

Embodiment 32. The food cutting system of any of these embodiments, wherein the cutting elements form a grid that extends from the base, the grid is configured to be releasably attachable to a frame of the cutter, and further comprising a second grid of cutting elements that differs from the grid, wherein the second grid of cutting elements also is configured to be releasably attachable to the frame.

Embodiment 33. The food cutting system of any of these embodiments, wherein the base is configured to be releasably secured to the frame.

Embodiment 34. The food cutting system of any of these embodiments, wherein at least one of the base and the frame comprises spring-loaded latches for securing the frame to the base.

Embodiment 35. The food cutting system of any of these embodiments, further comprising a second pan that differs from the pan, and the pan and the second pan are configured to be interchangeable with the cutter.

Embodiment 36. The food cutting system of any of these embodiments, further comprising a countertop rest configured to retain the cutter when the cutter is not mounted to the pan, and the countertop rest comprises recesses for receiving the cutting elements when the cutter is not in use.

Embodiment 37. The food cutting system of any of these embodiments, wherein the pan comprises a pan body and a false bottom configured to be removably mounted to the pan body, and a gasket configured to be located between the pan body and the false bottom.

Embodiment 38. The food cutting system of any of these embodiments, wherein the false bottom comprises cutting element recesses configured to allow the cutting elements to completely penetrate the food during cutting, without damaging the cutting elements at a greatest depth of insertion, such that the cutting elements do not contact the false bottom while cutting food.

Embodiment 39. The food cutting system of any of these embodiments, wherein the gasket comprises a lip on a lower portion thereof for enabling the gasket to self-align with an opening in the pan body, and the gasket comprises an over-molded lip on an upper portion thereof to provide a slight interference fit with the false bottom for securing the false bottom in the pan.

Embodiment 40. The food cutting system of any of these embodiments, wherein the false bottom is reversible and has a round edge.

Embodiment 41. The food cutting system of any of these embodiments, wherein the cutter comprises metal, the press comprises polymer, and the gasket comprises silicone.

Embodiment 42. The food cutting system of any of these embodiments, wherein the cutting elements comprise wires.

Embodiment 43. The food cutting system of any of these embodiments, wherein the cutting elements comprise blades.

Embodiment 44. A food processing system, comprising:
 a pan having a surface configured to support food;
 cutter configured to be mounted to the pan, and the cutter is configured to move relative to the pan via leverage therebetween to cut food in the pan; and
 an actuator configured to be releasably attached to the pan, wherein the actuator is configured to move the cutter relative to the pan.

Embodiment 45. The food cutting system of any of these embodiments, wherein the pan comprises a receptacle, and the actuator comprises an actuator base that is configured to be releasably secured in the receptacle.

Embodiment 46. The food cutting system of any of these embodiments, wherein the actuator comprises a handle that is configured to move relative to the pan.

Embodiment 47. The food cutting system of any of these embodiments, wherein the actuator comprises a pinion configured to move a rack on the cutter.

Embodiment 48. The food cutting system of any of these embodiments, wherein at least one of the actuator and the pan comprises a snap-in mechanism for releasably securing the actuator to the pan, and the snap-in mechanism is configured to provide positive confirmation of proper securement of the actuator to the pan.

Embodiment 49. The food cutting system of any of these embodiments, wherein said at least one of the actuator and the pan comprises a release mechanism configured to release the snap-in mechanism for releasing the actuator from the pan.

Embodiment 50. The food cutting system of any of these embodiments, wherein the actuator can be releasably attached to an accessory that differs from the pan for actuation of the accessory.

Embodiment 51. The food cutting system of any of these embodiments, wherein the accessory comprises one or more of the following items: a dough press for forming shaped food items, a meat press, a meat slicer, a meat tenderizer, a meat grinder, a tortilla press, a cheese cutter, a vegetable cutter, a pizza cutter, a donut cutter, a wine bottle opener, a can crusher, a can opener, a nut cracker, an ice crusher, a pasta extruder, a pasta press, a vegetable spiraler, a vegetable shredder, a fruit juicer, a fruit corer, a garlic press, a corn shredder, a bread slicer, a bagel guillotine, an herb mincer, a potato cutter, a potato peeler, a hard-boiled egg slicer, a hard-boiled egg shell peeler, a cherry pitter, a corn shredder, an attachment for a blender or mixer, a bar-in-a-box or baker-in-a-box.

Embodiment 52. The food cutting system of any of these embodiments, wherein the actuator attaches to the accessory in a same way as the actuator attaches to the pan.

Embodiment 53. The food cutting system of any of these embodiments, wherein the accessory further comprises at least one of the following additional mechanisms: a gear, a pinion, a lever, a rotational transfer device.

Embodiment 54. The food cutting system of any of these embodiments, wherein the actuator attaches to the accessory via at least one of the following items: a pull lock, a removable pin in holes of the actuator and the accessory, a rotatable key lock, a rotatable spline lock, a slide lock, a tongue and groove lock, a clamp, a snap ring, a mount connector, a quick-release mechanism, a cam lock, threads, a button snap.

Embodiment 55. The food cutting system of any of these embodiments, wherein the accessory comprises a stand configured to be releasably attached to the actuator.

Embodiment 56. The food cutting system of any of these embodiments, wherein the accessory is configured to be adjustably attached to the stand at different elevations.

Embodiment 57. The food cutting system of any of these embodiments, wherein the accessory is configured to be releasably attached to the stand.

Embodiment 58. The food cutting system of any of these embodiments, wherein a plurality of accessories is configured to be interchangeably and releasably attached to the stand.

Embodiment 59. The food cutting system of any of these embodiments, further comprising a stand configured to store the actuator when the actuator is not in use.

Embodiment 60. The food cutting system of any of these embodiments, wherein the stand comprises compartments configured to store one or more accessories.

Embodiment 61. The food cutting system of any of these embodiments, wherein the actuator comprises a plurality of actuators, each of which is configured to be individually releasably attached to the pan; and further comprising:
 an extended handle configured to be coupled to the actuators, such that the actuators are configured to move the cutter relative to the pan in unison via the extended handle.

Embodiment 62. A food processing system, comprising:
 base;
 an actuator configured to be releasably mounted to the base, the actuator having an unactuated position and an actuated position; and
 a plurality of accessories, each configured to be individually and interchangeably mountable to and releasable from at least one of the base or the actuator, such that each accessory performs a food processing function when the actuator is moved from the unactuated position to the actuated position.

Embodiment 63. A food cutting system, comprising:
 a pan having a surface configured to support food;
 a cutter configured to be mounted to the pan and cut food, the cutter comprises a base with a first cutter portion on one side of the base, the first cutter portion has a first set of cutting elements oriented in a first direction, the base has a second cutter portion separated from and adjacent to the first cutter portion on another side of the base, and the second cutter portion has a second set of cutting elements oriented in a second direction that differs from the first direction; and the cutter comprises a first cut position in the pan wherein the cutter is configured to make a first set of cuts in the food, a second cut position in the pan that differs from the first cut position wherein the cutter is configured to make a second set of cuts in the food after the first set of cuts, and the second set of cuts differs from the first set of cuts.

Embodiment 64. The food cutting system of any of these embodiments, wherein the first direction is substantially perpendicular to the second direction.

Embodiment 65. A method of cutting food, comprising:
 (a) providing a pan with food;
 (b) mounting a cutter to the pan in a first cut position and making a first set of cuts in the food;
 (c) reorienting the cutter relative to the pan and remounting the cutter to the pan in a second cut position that differs from the first cut position and making a second set of cuts in the food that differs from the first set of cuts.

Embodiment 66. The method of any of these embodiments, wherein step (c) comprising actuating a mechanism to move the cutter from the first cut position to the second cut position.

Embodiment 67. The method of any of these embodiments, wherein step (c) comprises manually removing the cutter from the pan, manually reorienting the cutter in the second cut position, and then manually securing the cutter to the pan.

Embodiment 68. The method of any of these embodiments, wherein the cutter is not spring-biased relative to the pan.

Embodiment 69. The method of any of these embodiments, wherein the pan and the cutter are configured to engage each other and provide leverage therebetween to force the cutting elements into and out of the food.

Embodiment 70. A food processing system, comprising:
 base;
 an actuator configured to be releasably mounted to the base, the actuator having an unactuated position and an actuated position; and
 a plurality of accessories, each configured to be individually and interchangeably mountable to and releasable from at least one of the base or the actuator, such that each accessory performs a food processing function when the actuator is moved from the unactuated position to the actuated position.

Embodiment 71. The food processing system of claim 1, wherein the base comprises a receptacle, and the actuator comprises an actuator base that is configured to be releasably secured in the receptacle.

Embodiment 72. The food processing system of claim 1, wherein the actuator comprises a handle that is configured to move relative to the base.

Embodiment 73. The food processing system of claim 1, wherein the actuator comprises a pinion configured to move a rack on the base.

Embodiment 74. The food processing system of claim 1, wherein at least one of the actuator and the base comprises a snap-in mechanism for releasably securing the actuator to the base, and the snap-in mechanism is configured to provide positive confirmation of proper securement of the actuator to the base.

Embodiment 75. The food processing system of claim 5, wherein the at least one of the actuator and the base comprises a release mechanism configured to release the snap-in mechanism for releasing the actuator from the base.

Embodiment 76. The food processing system of claim 1, wherein the base comprises a pan.

Embodiment 77. The food processing system of claim 1, wherein the accessories comprise one or more of the following items: a dough press for forming shaped food items, a meat press, a meat slicer, a meat tenderizer, a meat grinder, a tortilla press, a cheese cutter, a vegetable cutter, a pizza cutter, a donut cutter, a wine bottle opener, a can crusher, a can opener, a nut cracker, an ice crusher, a pasta extruder, a pasta press, a vegetable spiraler, a vegetable shredder, a fruit juicer, a fruit corer, a garlic press, a corn shredder, a bread slicer, a bagel guillotine, an herb mincer, a potato cutter, a potato peeler, a hard-boiled egg slicer, a hard-boiled egg shell peeler, a cherry pitter, a corn shredder, an attachment for a blender or mixer, a bar-in-a-box or baker-in-a-box.

Embodiment 78. The food processing system of claim 1, wherein each accessory attaches to the base or the actuator in a same way.

Embodiment 79. The food processing system of claim 1, wherein at least some of the accessories further comprise at least one of the following additional mechanisms: a gear, a pinion, a lever or a rotational transfer device.

Embodiment 80. The food processing system of claim 1, wherein each of the accessories attaches to the base or the actuator via at least one of the following items: a pull lock, a removable pin in holes of the actuator and the accessory, a rotatable key lock, a rotatable spline lock, a slide lock, a tongue and groove lock, a clamp, a snap ring, a mount connector, a quick-release mechanism, a cam lock, threads or a button snap.

Embodiment 81. The food processing system of claim 1, wherein at least some of the accessories are configured to be adjustably attached to the base at different elevations.

Embodiment 82. The food processing system of claim 1, further comprising a stand configured to store the actuator when the actuator is not in use.

Embodiment 83. The food processing system of claim 1, wherein the actuator comprises a plurality of actuators, each of which is configured to be individually releasably attached to the base; and further comprising:
 an extended handle configured to be coupled to the actuators, such that the actuators are configured to move one of the accessories relative to the base in unison via the extended handle.

Embodiment 84. The food processing system of claim 1, wherein the base comprises a pan having a surface configured to support food;
 a cutter configured to be mounted to the pan, the cutter comprises a cutter base and cutting elements mounted to the cutter base, and the cutting elements are configured to move relative to the pan to cut food in the pan; and
 a press configured to be coupled to the cutter and configured to retain food in the pan as the cutting elements are removed from the food after cutting the food.

Embodiment 85. A food processing system, comprising:
 a pan having a surface configured to support food;
 a cutter configured to be mounted to the pan, and the cutter is configured to move relative to the pan via leverage therebetween to cut food in the pan;
 an actuator configured to be releasably attached to the pan, wherein the actuator is configured to move the cutter relative to the pan; and
 a press configured to be coupled to the cutter and configured to retain food in the pan as the cutting elements are removed from the food after cutting the food.

Embodiment 86. The food processing system of claim 16, wherein the actuator can be releasably attached to an accessory that differs from the pan for actuation of the accessory.

Embodiment 87. The food processing system of claim 17, wherein the accessory comprises one or more of the following items: a dough press for forming shaped food items, a meat press, a meat slicer, a meat tenderizer, a meat grinder, a tortilla press, a cheese cutter, a vegetable cutter, a pizza cutter, a donut cutter, a wine bottle opener, a can crusher, a can opener, a nut cracker, an ice crusher, a pasta extruder, a pasta press, a vegetable spiraler, a vegetable shredder, a fruit juicer, a fruit corer, a garlic press, a corn shredder, a bread slicer, a bagel guillotine, an herb mincer, a potato cutter, a potato peeler, a hard-boiled egg slicer, a hard-boiled egg shell peeler, a cherry pitter, a corn shredder, an attachment for a blender or mixer, a bar-in-a-box or baker-in-a-box.

Embodiment 88. The food processing system of claim 17, wherein the actuator attaches to the accessory in a same way as the actuator attaches to the pan.

Embodiment 89. The food processing system of claim 17, wherein:

the accessory further comprises at least one of the following additional mechanisms: a gear, a pinion, a lever or a rotational transfer device; and the actuator attaches to the accessory via at least one of the following items: a pull lock, a removable pin in holes of the actuator and the accessory, a rotatable key lock, a rotatable spline lock, a slide lock, a tongue and groove lock, a clamp, a snap ring, a mount connector, a quick-release mechanism, a cam lock, threads or a button snap.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A food processing system, comprising:
  a pan that is substantially rectangular in shape with rounded corners, formed from metal and configured to support food, the pan comprises a sidewall with an open top, a bottom, and the bottom consists of a single opening in the bottom;
  a false bottom configured to be removably mounted at the bottom of the pan to cover the single opening in the bottom of the pan; and
  a gasket configured to be located and seal between the pan and the false bottom, the gasket is mounted to the pan at an interior surface of the sidewall, an upper surface of the bottom and at a lower surface of the bottom, and the gasket extends into contact with a perimeter and a bottom surface of the false bottom.

2. The food processing system of claim 1, wherein the gasket is configured to provide an interference fit between the pan and the false bottom.

3. The food processing system of claim 1, wherein the gasket comprises a lip on a lower portion thereof, wherein the lip is configured to enable the gasket to self-align with the opening in the bottom.

4. The food processing system of claim 1, wherein the gasket comprises an over-molded lip on an upper portion thereof, and the over-molded lip is configured to provide an interference fit with the false bottom.

5. The food processing system of claim 1, wherein the false bottom is configured to be reversible.

6. A food processing system, comprising:
   a pan configured to support food, the pan comprises a sidewall, a bottom, an opening in the bottom;
   a false bottom removably mounted at the bottom of the pan to cover the opening, the false bottom having an outermost perimeter and a bottom surface; and
   a gasket mounted to the pan at an interior surface of the sidewall, an upper surface of the bottom and a lower surface of the bottom, and the gasket extends into contact with the outermost perimeter and the bottom surface of the false bottom.

7. The food processing system of claim 6, wherein the gasket provides an interference fit between the pan and the false bottom.

8. The food processing system of claim 6, wherein the gasket comprises a lip on a lower portion thereof, wherein the lip is configured to enable the gasket to self-align with the opening in the pan.

9. The food processing system of claim 6, wherein the gasket comprises an over-molded lip on an upper portion thereof, and the over-molded lip is configured to provide an interference fit with the false bottom, such that the false bottom is configured to snap into place in the pan.

* * * * *